(12) United States Patent
Kitazato

(10) Patent No.: US 8,875,204 B2
(45) Date of Patent: Oct. 28, 2014

(54) INFORMATION PROCESSOR, INFORMATION PROCESSING METHOD AND PROGRAM

(75) Inventor: Naohisa Kitazato, Tokyo (JP)

(73) Assignee: Sony Corporation, Tokyo (JP)

( * ) Notice: Subject to any disclaimer, the term of this patent is extended or adjusted under 35 U.S.C. 154(b) by 93 days.

(21) Appl. No.: 13/239,871

(22) Filed: Sep. 22, 2011

(65) Prior Publication Data

US 2012/0084824 A1    Apr. 5, 2012

Related U.S. Application Data

(60) Provisional application No. 61/498,163, filed on Jun. 17, 2011, provisional application No. 61/388,999, filed on Oct. 1, 2010.

(51) Int. Cl.
  *H04N 7/173*   (2011.01)
  *H04H 60/13*   (2008.01)
  *H04H 20/93*   (2008.01)
  *H04N 21/854*  (2011.01)
  *H04H 20/38*   (2008.01)

(52) U.S. Cl.
  CPC ............. *H04N 21/854* (2013.01); *H04H 60/13* (2013.01); *H04H 20/93* (2013.01); *H04H 20/38* (2013.01)
  USPC ............................................... 725/97; 725/93

(58) Field of Classification Search
  CPC .................................................. H04N 7/17318
  USPC .......................................................... 725/97
  See application file for complete search history.

(56) References Cited

U.S. PATENT DOCUMENTS 7,584,491 B2 *   9/2009   Bruckner et al. ............... 725/36
2003/0033157 A1  2/2003   Dempski et al.

(Continued)

FOREIGN PATENT DOCUMENTS

EP   1 389 020     2/2004
JP   2003-9113     1/2003

(Continued)

OTHER PUBLICATIONS

International Search Report issued Dec. 20, 2011, in PCT/JP2011/071567 filed Sep. 22, 2011 (with English translation).

(Continued)

*Primary Examiner* — Jefferey Harold
*Assistant Examiner* — Justin Sanders
(74) *Attorney, Agent, or Firm* — Oblon, Spivak, McClelland, Maier & Neustadt, L.L.P.

(57) ABSTRACT

An information processor includes: a content acquisition section adapted to acquire linked content that includes a plurality of scenarios, each made up of content data and control information used to control the reproduction of the content data; a control information acquisition section adapted to acquire the control information; and a reproduction control section adapted to control the reproduction of the linked content by reproducing the content data according to the control information, wherein the control information acquisition section acquires, as an event adapted to allow a move from the current scenario to another scenario, the control information including an absolute time-of-day event that occurs at a specific date and time on the scenario time axis, and the reproduction control section allows a move from the current scenario to another scenario if the absolute time-of-day event occurs.

12 Claims, 27 Drawing Sheets

| ELEMENT (ATTRIBUTE) | | | OCCURRENCES | VALUE | DEFINITION AND DETAILED USAGE | BASIC PROFILE RESTRICTION |
|---|---|---|---|---|---|---|
| event | | | 0..N | | BRANCH EVENT | MAX. COUNT |
| | @streamend | | 0..1 | 1 fix | END OF STREAM (CAN BE USED ONLY FOR A CONNECTED BRANCH) | |
| | @autoevent | | 0..1 | 1 fix | CAUSES A BRANCH REGARDLESS OF THE USER OPERATION WHEN THE VALUE IS "1" AND WHEN THE EVENT CONDITION IS SATISFIED | NOT USED |
| | timeframe | | 0..1 | | TIME FRAME OF THE BRANCH EVENT | |
| | | @startNRT | 0..1 | | EVENT START TIME POSITION (TIME FROM THE BEGINNING OF CONTENT) | |
| | | @endNRT | 0..1 | | EVENT END TIME POSITION (TIME FROM THE BEGINNING OF CONTENT) | |
| | absolute_timeframe | | 0..1 | | ABSOLUTE DATE AND TIME FRAME OF THE BRANCH EVENT | |
| | | @start_time | 1 | | EVENT START DATE AND TIME | |
| | | @end_time | 1 | | EVENT END DATE AND TIME | |
| | spaceframe | | 0..1 | | SPACE FRAME OF THE BRANCH EVENT | NOT USED |
| | | @uppeleft_horizontal | 1 | | SPACE FRAME OF THE UPPER LEFT HORIZONTAL COORDINATE | |
| | | @upperleft_vertical | 1 | | SPACE FRAME OF THE UPPER LEFT VERTICAL COORDINATE | |
| | | @lowerright_horizontal | 1 | | SPACE FRAME OF THE LOWER RIGHT HORIZONTAL COORDINATE | |
| | | @lowerright_vertical | 1 | | SPACE FRAME OF THE LOWER RIGHT VERTICAL COORDINATE | |
| | bridge | | 1 | | BRIDGE | |
| | branch | | 1..N | | BRANCH | |

(56) References Cited

U.S. PATENT DOCUMENTS

| | | | |
|---|---|---|---|
| 2003/0037068 | A1 | 2/2003 | Thomas et al. |
| 2003/0086003 | A1 | 5/2003 | Koga |
| 2004/0031058 | A1* | 2/2004 | Reisman ............... 725/112 |
| 2006/0194535 | A1 | 8/2006 | Houldsworth et al. |
| 2006/0242692 | A1* | 10/2006 | Thione et al. ............... 726/9 |
| 2007/0169164 | A1 | 7/2007 | Marilly et al. |
| 2008/0028074 | A1 | 1/2008 | Ludvig |
| 2008/0120638 | A1 | 5/2008 | King et al. |
| 2008/0247543 | A1* | 10/2008 | Mick et al. ............... 380/201 |
| 2009/0087161 | A1 | 4/2009 | Roberts et al. |
| 2009/0125946 | A1 | 5/2009 | Fukuda |
| 2009/0313663 | A1 | 12/2009 | Kitazato et al. |
| 2009/0320064 | A1 | 12/2009 | Soldan et al. |
| 2010/0205628 | A1 | 8/2010 | Davis et al. |
| 2012/0011261 | A1 | 1/2012 | Hirano et al. |

FOREIGN PATENT DOCUMENTS

| | | |
|---|---|---|
| JP | 2003-18583 | 1/2003 |
| JP | 2003-530033 | 10/2003 |
| JP | 2006-50237 | 2/2006 |
| JP | 2007-116669 | 5/2007 |
| JP | 2008-53916 | 3/2008 |
| JP | 2009-118343 | 5/2009 |
| JP | 2010-288192 | 12/2010 |
| WO | WO 2010/109860 A1 | 9/2010 |

OTHER PUBLICATIONS

International Search Report issued Dec. 20, 2011, in PCT/JP2011/071568 filed Sep. 22, 2011 (with English translation).
International Search Report issued Dec. 27, 2011, in PCT/JP2011/071569 filed Sep. 22, 2011 (with English translation).
International Search Report issued Dec. 27, 2011, in PCT/JP2011/071570 filed Sep. 22, 2011 (with English translation).
Hideaki Kimata, "Movement on MPEG 3DAV toward International Standardization of 3D Video", IPSJ SIG Technical Reports, vol. 2005, No. 23, 2005, 10 pages (with English Abstract).
U.S. Appl. No. 13/422,203, filed Mar. 16, 2012, Kitazato, et al.
U.S. Appl. No. 13/452,376, filed Apr. 20, 2012, Kitahara, et al.
U.S. Appl. No. 13/554,688, filed Jul. 20, 2012, Kitazato, et al.
International Search Report issued Jul. 17, 2012, in PCT/JP2012/064806 with English translation.
Kentaro Yamazaki, "Open House 2011. Linking the TV and the SNS [Hybridcast]", http://av.watch.impress.co.jp/docs/news/20110524_448049.html, published on web May 24, 2011, 6 pages.
U.S. Appl. No. 13/238,080, filed Sep. 21, 2011, Kitazato, et al.
U.S. Appl. No. 13/238,065, filed Sep. 21, 2011, Kitazato.
U.S. Appl. No. 13/238,264, filed Sep. 21, 2011, Kitazato.
U.S. Appl. No. 13/238,277, filed Sep. 21, 2011, Kitazato.
U.S. Appl. No. 13/238,138, filed Sep. 21, 2011, Kitazato.
U.S. Appl. No. 13,220,231, filed Aug. 29, 2011, Kitahara, et al.
U.S. Appl. No. 13/071,559, filed Mar. 25, 2011, Yamagishi, et al.
U.S. Appl. No. 13/081,566, filed Apr. 7, 2011, Kitazato, et al.
U.S. Appl. No. 12/980,917, filed Dec. 29, 2010, Dewa.
U.S. Appl. No. 13/080,866, filed Apr. 6, 2011, Kitazato, et al.
U.S. Appl. No. 13/071,551, filed Mar. 25, 2011, Kitazato, et al.
U.S. Appl. No. 13/071,560, filed Mar. 25, 2011, Yamagishi.
U.S. Appl. No. 13/071,238, filed Mar. 24, 2011, Yamagishi.
U.S. Appl. No. 13/075,440, filed Mar. 30, 2011, Yamagishi, et al.
U.S. Appl. No. 13/107,604, filed May 13, 2011, Dewa.
International Search Report issued Nov. 29, 2011 in patent application No. PCT/JP2011/071566 filed Sep. 22, 2011 with English translation.
Extended Search Report issued Feb. 6, 2014 in European Application No. 11828915.6.
Extended Search Report issued Feb. 26, 2014 in European Application No. 11828910.7.
Extended Search Report issued Mar. 6, 2014 in European Application No. 11828911.5.
Office Action issued Feb. 20, 2014 in Japanese Application No. 2013-520530 (With English Translation).
Extended European Search Report issued May 8, 2014 in European Patent Application No. 11828912.3.
Extended European Search Report issued May 12, 2014, in European Patent Application No. 11828914.9.

* cited by examiner

FIG.10

| ELEMENT (ATTRIBUTE) | OCCURRENCES | VALUE | DEFINITION AND DETAILED USAGE | BASIC PROFILE RESTRICTION |
|---|---|---|---|---|
| scenario | 1 | | SCENARIO ELEMENT (WHOLE) | |
| @profile | 1 | | PROFILE NUMBER | 1.1 |
| @id | 1 | INTEGER | SCENARIO ID | |
| @provider | 0..1 | | PROVIDER LABEL | |
| @media | 0..1 | "movie", "still", "slide_show", "app" | SCENARIO MEDIA TYPE | "app" LIMITEDLY USED |
| @link | 1 | "loop", "connected", "terminated" | SCENARIO LINK TYPE | |
| entry | 1..2 | | | |
| @type | 1 | "cad", | ENTRY FILE TYPE | |
| @stereoscopic | 0..1 | "2D","3D" | DISTINCTION OF SCENARIO STREAM BETWEEN 2D AND 3D | |
| @location | 1 | | ENTRY FILE URL | |
| event | 0..N | | BRANCH EVENT INFORMATION | |
| commontoken | 0..1 | | USER AUTHENTICATION AND CONTEXT INFORMATION; FORMAT IS PROVIDER-DEPENDENT | MAX. |
| providertoken | 0..1 | | | NOT USED |

FIG. 11

| ELEMENT (ATTRIBUTE) | OCCURRENCES | VALUE | DEFINITION AND DETAILED USAGE | BASIC PROFILE RESTRICTION |
|---|---|---|---|---|
| event | 0..N | | BRANCH EVENT | MAX. COUNT |
| @streamend | 0..1 | 1 fix | END OF STREAM (CAN BE USED ONLY FOR A CONNECTED BRANCH) | |
| @autoevent | 0..1 | 1 fix | CAUSES A BRANCH REGARDLESS OF THE USER OPERATION WHEN THE VALUE IS "1" AND WHEN THE EVENT CONDITION IS SATISFIED | NOT USED |
| timeframe | 0..1 | | TIME FRAME OF THE BRANCH EVENT | |
| @startNRT | 0..1 | | EVENT START TIME POSITION (TIME FROM THE BEGINNING OF CONTENT) | |
| @endNRT | 0..1 | | EVENT END TIME POSITION (TIME FROM THE BEGINNING OF CONTENT) | |
| absolute_timeframe | 0..1 | | ABSOLUTE DATE AND TIME FRAME OF THE BRANCH EVENT | |
| @start_time | 1 | | EVENT START DATE AND TIME | |
| @end_time | 1 | | EVENT END DATE AND TIME | |
| spaceframe | 0..1 | | SPACE FRAME OF THE BRANCH EVENT | NOT USED |
| @upleft_horizontal | 1 | | SPACE FRAME OF THE UPPER LEFT HORIZONTAL COORDINATE | |
| @upperleft_vertical | 1 | | SPACE FRAME OF THE UPPER LEFT VERTICAL COORDINATE | |
| @lowerright_horizontal | 1 | | SPACE FRAME OF THE LOWER RIGHT HORIZONTAL COORDINATE | |
| @lowerright_vertical | 1 | | SPACE FRAME OF THE LOWER RIGHT VERTICAL COORDINATE | |
| bridge | 1 | | BRIDGE | |
| branch | 1..N | | BRANCH | |

FIG. 12

| ELEMENT (ATTRIBUTE) | | OCCURRENCES | VALUE | DEFINITION AND DETAILED USAGE | BASIC PROFILE RESTRICTION |
|---|---|---|---|---|---|
| bridge | | | | BRIDGE | |
| | @immediate | 0..1 | 1 | ACTIVATES THE BRANCH SCENARIO IF NO USER SELECTION IS MADE | |
| | @layouttype | 1 | | BRIDGE SCREEN LAYOUT PATTERN | "0" ONLY |
| | bridgepicture | 0..N | | STILL IMAGE INFORMATION FOR BRIDGE | NOT USED |
| | @id | 0..1 | 1~N | ON-SCREEN STILL IMAGE NUMBER | |
| | @type | 1 | | MEDIA TYPE | |
| | @url | 1 | | STILL IMAGE URL | |
| | bridgeaudio | 0..1 | | AUDIO INFORMATION FOR BRIDGE | NOT USED |
| | @url | 1 | | AUDIO FILE URL | |
| | bridgetitle | 1 | | BRIDGE SCREEN TITLE DESCRIPTION | |
| | @size | 0..1 | | FONT SIZE | NOT USED |
| | @font | 0..1 | | FONT TYPE | NOT USED |
| | @color | 0..1 | | FONT COLOR | NOT USED |
| | birdgedescription | 0..N | | BRIDGE SCREEN TEXT DESCRIPTION | |
| | @id | 1 | | DESCRIPTION NUMBER | "1" ONLY |
| | @size | 0..1 | | FONT SIZE | NOT USED |
| | @font | 0..1 | | FONT TYPE | NOT USED |
| | @color | 0..1 | | FONT COLOR | NOT USED |

FIG.13

| ELEMENT (ATTRIBUTE) | | OCCURRENCES | VALUE | DEFINITION AND DETAILED USAGE | BASIC PROFILE RESTRICTION |
|---|---|---|---|---|---|
| branch | | 1 | | | |
| | @scenarioid | 1 | | BRANCH DESTINATION SCENARIO ID | |
| | @profile | 0..1 | | BRANCH DESTINATION SCENARIO PROFILE IF NOT SPECIFIED, REGARD AS "1" | |
| | @provider | 1 | | BRANCH DESTINATION PROVIDER LABEL | |
| | @media | 0..1 | "movie","still", "slide_show", "app" "broadcast" | BRANCH DESTINATION SCENARIO MEDIA TYPE | "APP" LIMITEDLY USED |
| | @link | 1 | | BRANCH DESTINATION SCENARIO LINK TYPE | |
| entry | | 1 | | BRANCH ENTRY INFORMATION | |
| | @type | 1 | | ENTRY FILE TYPE | |
| | @location | 1 | | BRANCH DESTINATION ENTRY FILE URL | |
| | @starttime | 0..1 | | BRANCH DESTINATION SCENARIO START TIME POSITION | |
| selectdescription | | 0..1 | | DISPLAY INFORMATION FOR SELECTION OF BRANCH DESTINATION | MAX. COUNT |
| | @size | 1 | | FONT SIZE | NOT USED |
| | @font | 1 | | FONT TYPE | NOT USED |
| | @color | 1 | | FONT COLOR | NOT USED |
| | @highlightcolor | 1 | | FOCUS COLOR | NOT USED |

FIG.20
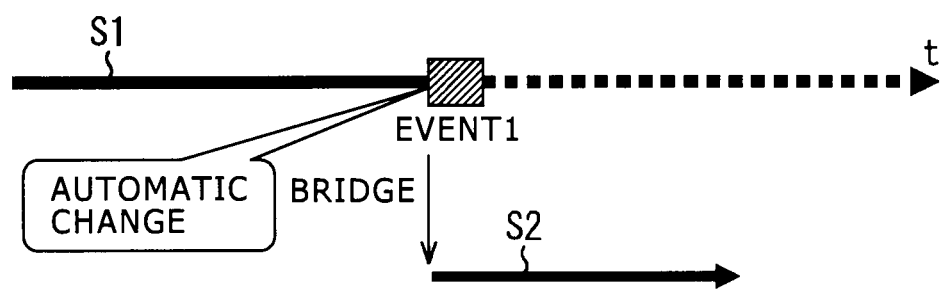
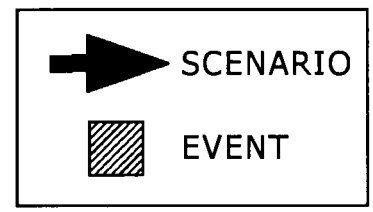

FIG.22
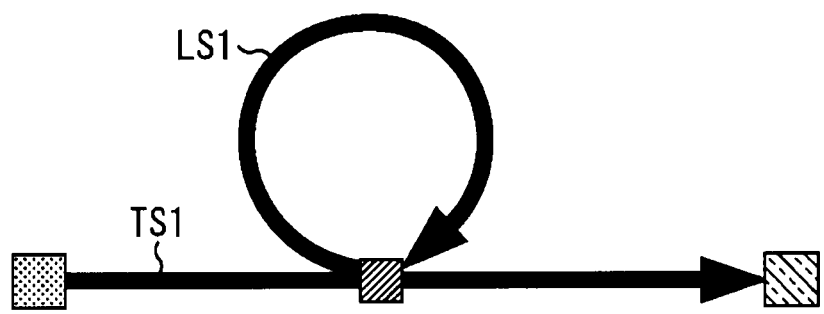
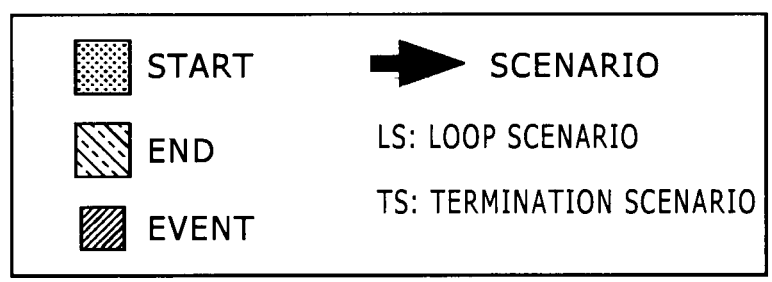

FIG.26
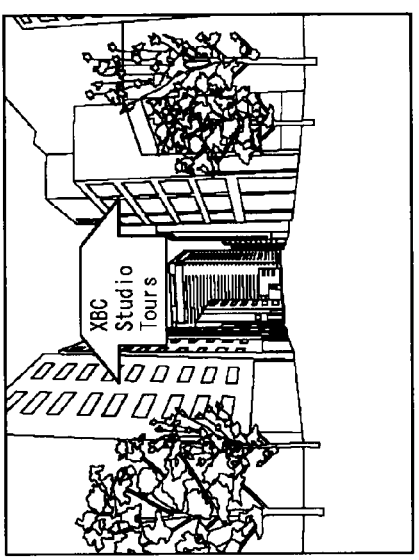
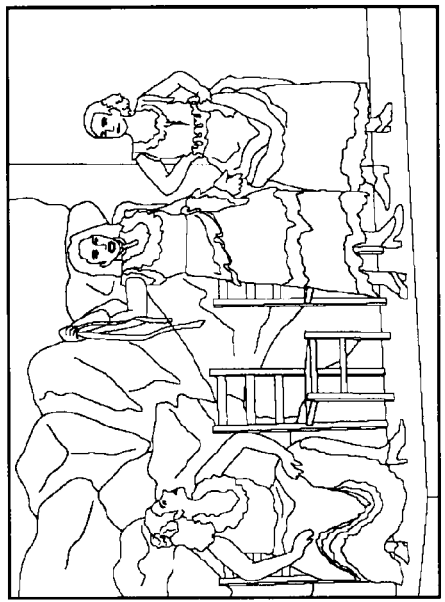
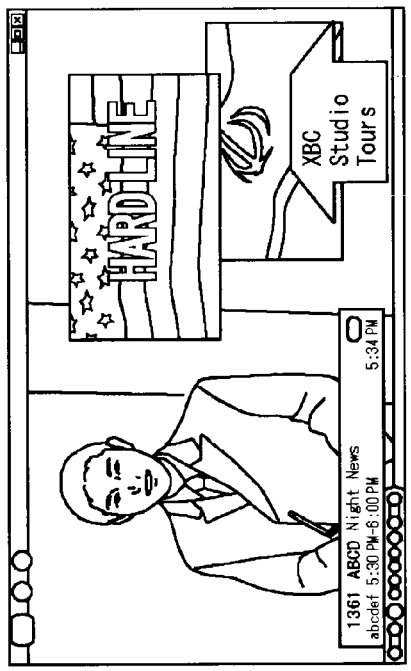
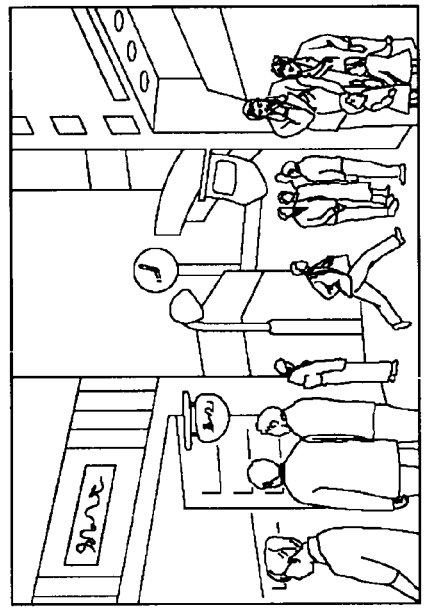

INFORMATION PROCESSOR, INFORMATION PROCESSING METHOD AND PROGRAM

CROSS-REFERENCE TO RELATED APPLICATION

This application claims the benefit of priority of Provisional Application Ser. Nos. 61/388,999, filed Oct. 1, 2010 and 61/498,163, filed Jun. 17, 2011, the entire contents of which is incorporated herein by reference.

BACKGROUND

The present technology relates to an information processor, information processing method and program, and more particularly, to an information processor, information processing method and program that can provide linked content having a variety of scenarios.

It is common for a viewer to browse the program table before selecting a desired broadcast channel when viewing a broadcast program. In on-demand streaming for IPTV (Internet Protocol TeleVision) that has become widespread in recent years, a piece of content is normally selected from a content list to view that piece of content.

The importance of combined telecommunications and broadcasting technologies is recognized to achieve more advanced broadcasting services. Various means adapted to switch between these services have been proposed to ensure coordination between telecommunications and broadcasting. However, a service that makes full use of the features of these means has yet to become a reality.

In the world of games, on the other hand, a multimedia engine is incorporated in a terminal device, and a plurality of streams made up of a plurality of time axes are linked together by executing a programming language to reproduce the streams. If this technique is applied to content other than games, it is possible to provide linked content.

However, incorporating a complicated multimedia engine is costly. Therefore, if complicated processing as required for games is unnecessary for a piece of content, advanced rendering capability provided by the multimedia engine is not necessary for that piece of content. For example, therefore, Japanese Patent Laid-Open No. 2008-113247 (hereinafter referred to as Patent Document 1) discloses a technology that performs processes such as reproducing or terminating different pieces of content in response to user operation on the branch screen adapted to reproduce a moving image file.

SUMMARY

However, the technology disclosed in Patent Document 1 simply defines the user operations adapted to allow the user to move from one piece of content to another. Therefore, only a simple move can be accomplished. Therefore, it is impossible to provide a variety of scenarios. As a result, linked content offering a variety of scenarios is sought after that is made possible, for example, by combined telecommunications and broadcasting technologies.

The present technology has been made in light of the foregoing, and it is an object of the present technology to provide linked content having a variety of scenarios.

An information processor according to a mode of the present technology includes a content acquisition section, control information acquisition section and reproduction control section. The content acquisition section acquires linked content that includes a plurality of scenarios, each made up of content data and control information used to control the reproduction of the content data. The control information acquisition section acquires the control information. The reproduction control section controls the reproduction of the linked content by reproducing the content data according to the control information. The control information acquisition section acquires, as an event adapted to allow a move from the current scenario to another, the control information including an absolute time-of-day event that occurs at a specific date and time on the scenario time axis. The reproduction control section allows a move from the current scenario to another if the absolute time-of-day event occurs.

Preferably, the control information acquisition section acquires, as the event, the control information including the absolute time-of-day event that occurs only in a time event in a predetermined time frame delimited by start and end points on the scenario time axis. The reproduction control section allows a move from the current scenario to another if the absolute time-of-day event occurs in the predetermined time frame.

Preferably, the information processor further includes a reception section and display control section. The reception section receives broadcast content that is broadcast via a broadcasting network. The display control section switches content used to display another scenario, to which a move is made from the current scenario, from the linked content to the broadcast content if the absolute time-of-day event occurs.

Preferably, the control information acquisition section acquires the control information including information used to identify the broadcast content. The display control section displays the broadcast content received according to the control information.

Preferably, the reproduction control section forcefully causes a move from the current scenario to another if the absolute time-of-day event occurs.

Preferably, the reproduction control section causes a move from the current scenario to another if the absolute time-of-day event occurs and if so instructed by the user operation.

An information processing method according to another mode of the present technology includes: an information processor acquiring linked content that includes a plurality of scenarios, each made up of content data and control information used to control the reproduction of the content data; and the information processor acquiring the control information. The information processing method further includes: the information processor controlling the reproduction of the linked content by reproducing the content data according to the control information; and the information processor acquiring, as an event adapted to allow a move from the current scenario to another, the control information including an absolute time-of-day event that occurs at a specific date and time on the scenario time axis. The information processing method further includes: the information processor allowing a move from the current scenario to another scenario if the absolute time-of-day event occurs.

A program according to a further mode of the present technology controls an information processor. The program causing a computer of the information processor to perform: acquiring linked content that includes a plurality of scenarios, each made up of content data and control information used to control the reproduction of the content data; and acquiring the control information. The program causing a computer of the information processor to further perform: controlling the reproduction of the linked content by reproducing the content data according to the control information; acquiring, as an event adapted to allow a move from the current scenario to another, the control information including an absolute timeof-day event that occurs at a specific date and time on the scenario time axis; and allowing a move from the current scenario to another scenario if the absolute time-of-day event occurs.

In the information processor, information processing method and program according to the modes of the present technology, linked content is acquired that includes a plurality of scenarios, each made up of content data and control information used to control the reproduction of the content data. The reproduction of the linked content is controlled by reproducing the content data according to the control information. The control information including an absolute time-of-day event that occurs at a specific date and time on the scenario time axis is acquired as an event adapted to cause a move from a current scenario to another. A move is made from the current scenario to another if the absolute time-of-day event occurs.

The modes of the present technology provides linked content offering a variety of scenarios.

BRIEF DESCRIPTION OF THE DRAWINGS

FIG. 10 is a table illustrating an example of detailed VSI specification (scenario);

FIG. 11 is a table illustrating an example of detailed VSI specification (event portion);

FIG. 12 is a table illustrating an example of detailed VSI specification (bridge portion);

FIG. 13 is a table illustrating an example of detailed VSI specification (branch portion);

FIG. 20 is a diagram describing an auto event;

FIG. 22 is a diagram illustrating an example of a content scenario;

FIG. 26 is a diagram illustrating an example of user experience attained by the content reproduction system.

DETAILED DESCRIPTION OF THE PREFERRED EMBODIMENT

A description will be given below of a preferred embodiment of the present technology with reference to the accompanying drawings.

[Comparison Between Ordinary Content and Linked Content]

A description will be given first of the commonalities and differences between ordinary content and linked content with reference to FIGS. 1 to 3.

Figure 1:
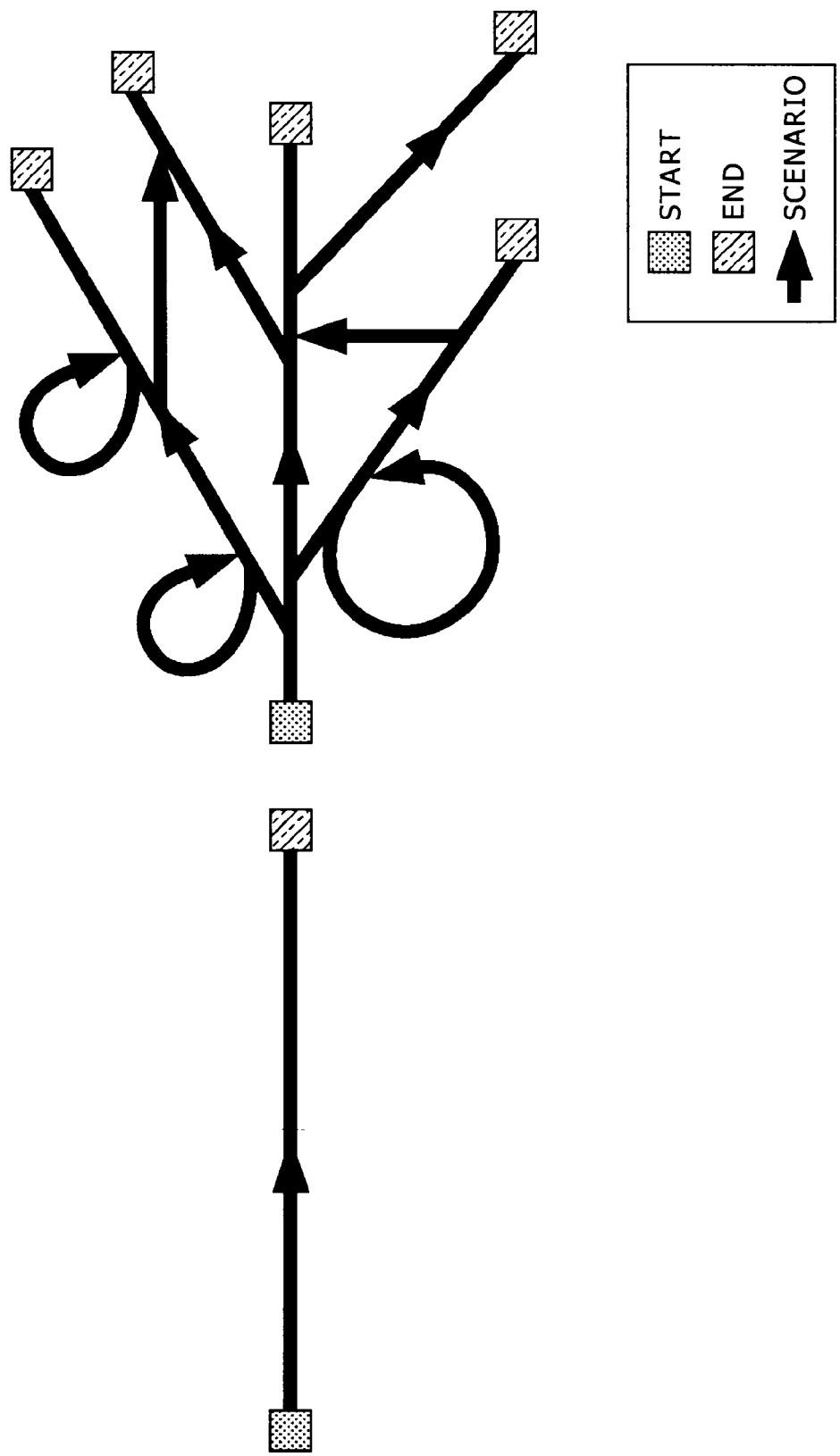
FIG. 1 is a diagram illustrating the difference between ordinary content and linked content.

As illustrated on the left side in FIG. 1, ordinary content includes a stream having a single time axis made up of a single start point and a single end point. In contrast, linked content is made up of a plurality of linked streams having a plurality of time axes, as illustrated on the right side in FIG. 1. Further, linked content includes a plurality of scenarios each made up of a stream having a single time axis.

Figure 2:
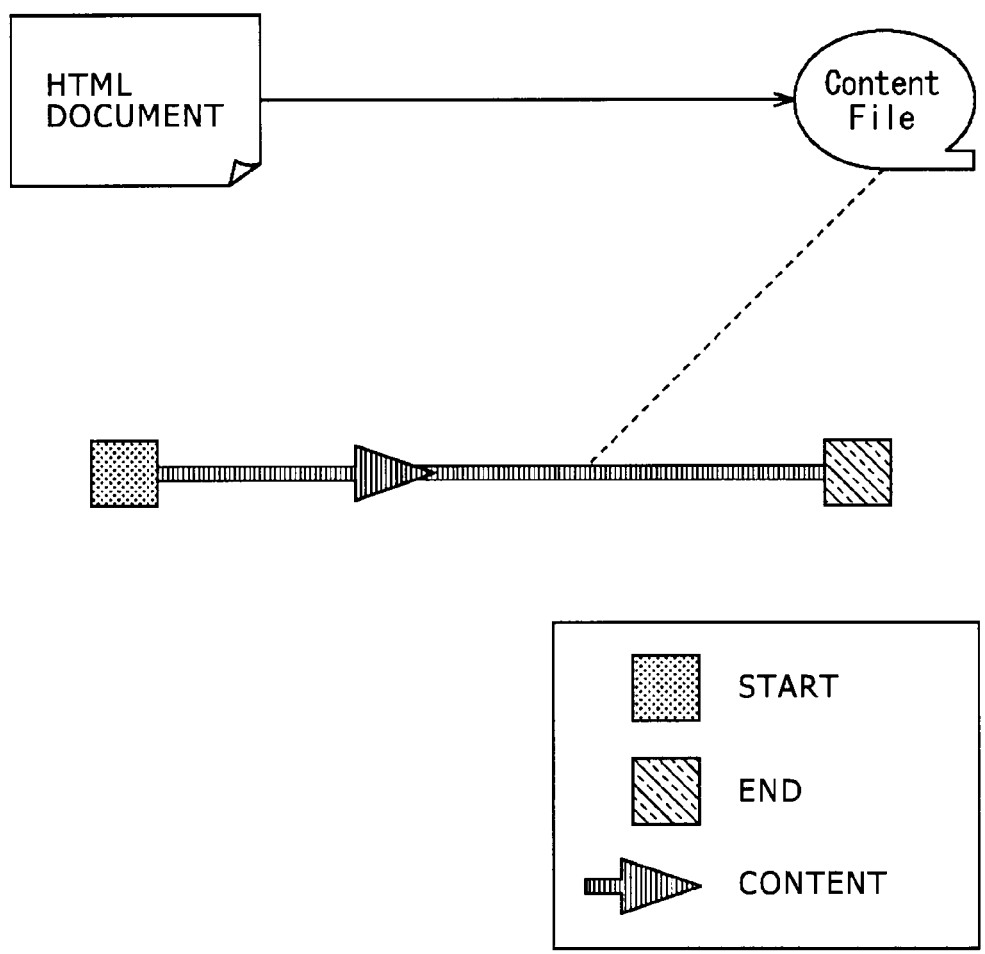
FIG. 2 is a diagram illustrating the configuration of ordinary content.

More specifically, when ordinary content is reproduced, the user selects a desired piece of content from the content list provided in the form of an HTML (Hyper Text Markup Language) document as illustrated in FIG. 2 to start the reproduction of that piece of content.

Figure 3:
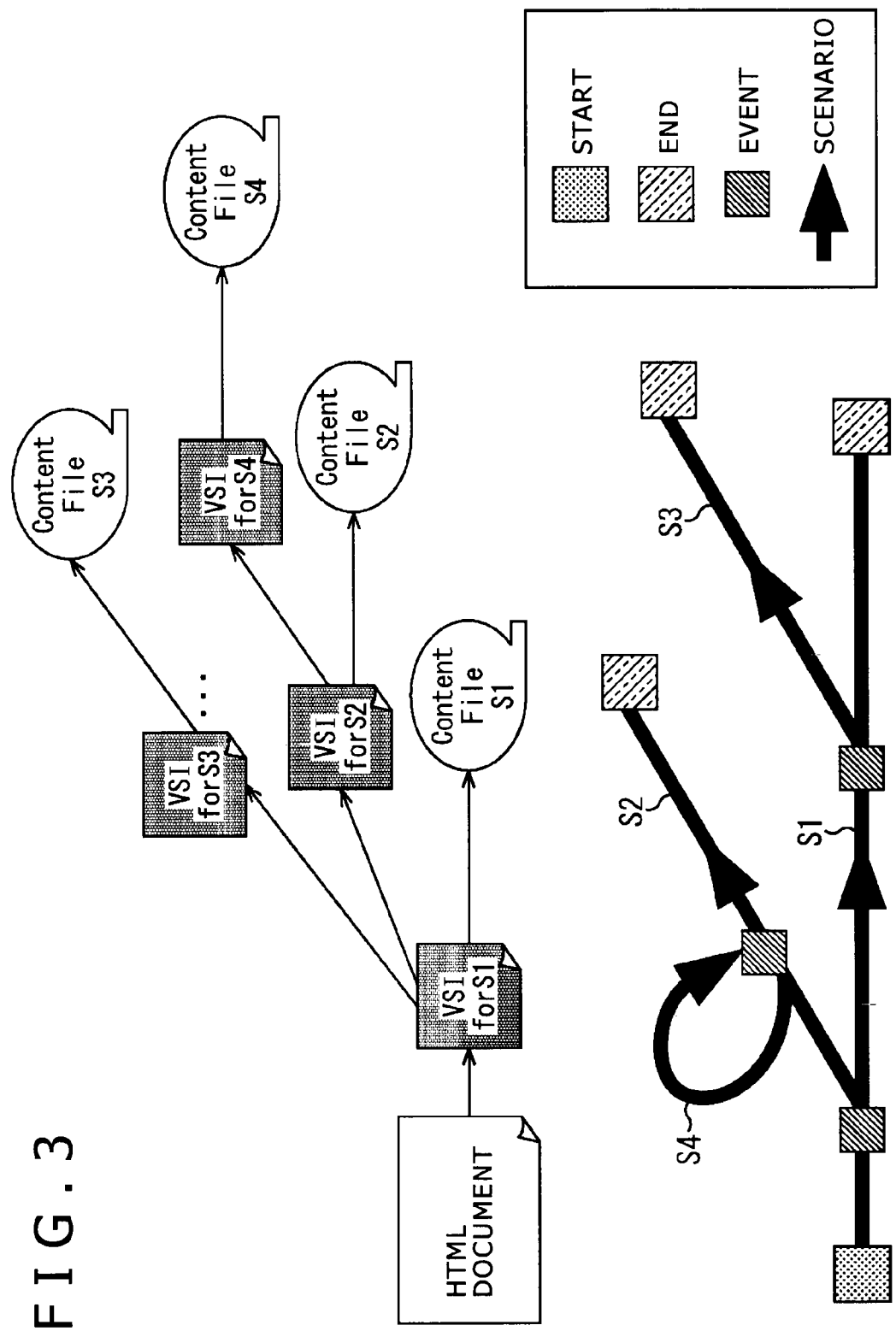
FIG. 3 is a diagram illustrating the configuration of linked content.

In contrast, in the case of linked content, when the user selects a desired piece of content from the content list provided in the form of an HTML document as illustrated in FIG. 3, VSI (Video Scenario Information) information, i.e., control information of the scenario to be reproduced first in the selected piece of content. Then, the content data is reproduced according to this VSI information. For example, even when a scenario S1 links to a scenario S2, VSI information of the scenario S2 is acquired by referencing the position of the VSI information of the scenario S2 given in the VSI information of the scenario S1. Then, the content data of the scenario S2 is acquired according to this VSI information of the scenario S2, after which the content data is reproduced.

As described above, each scenario includes a piece of content data and VSI information, i.e., control information used to control the reproduction of this piece of content data. It is to be noted that the detailed description of content of VSI information, for example, will be given later.

[Coordination Between Linked Content and Broadcast Content]

It is possible to provide a variety of scenarios if the above linked content is coordinated with broadcast content such as programs and CMs.

Figure 4:
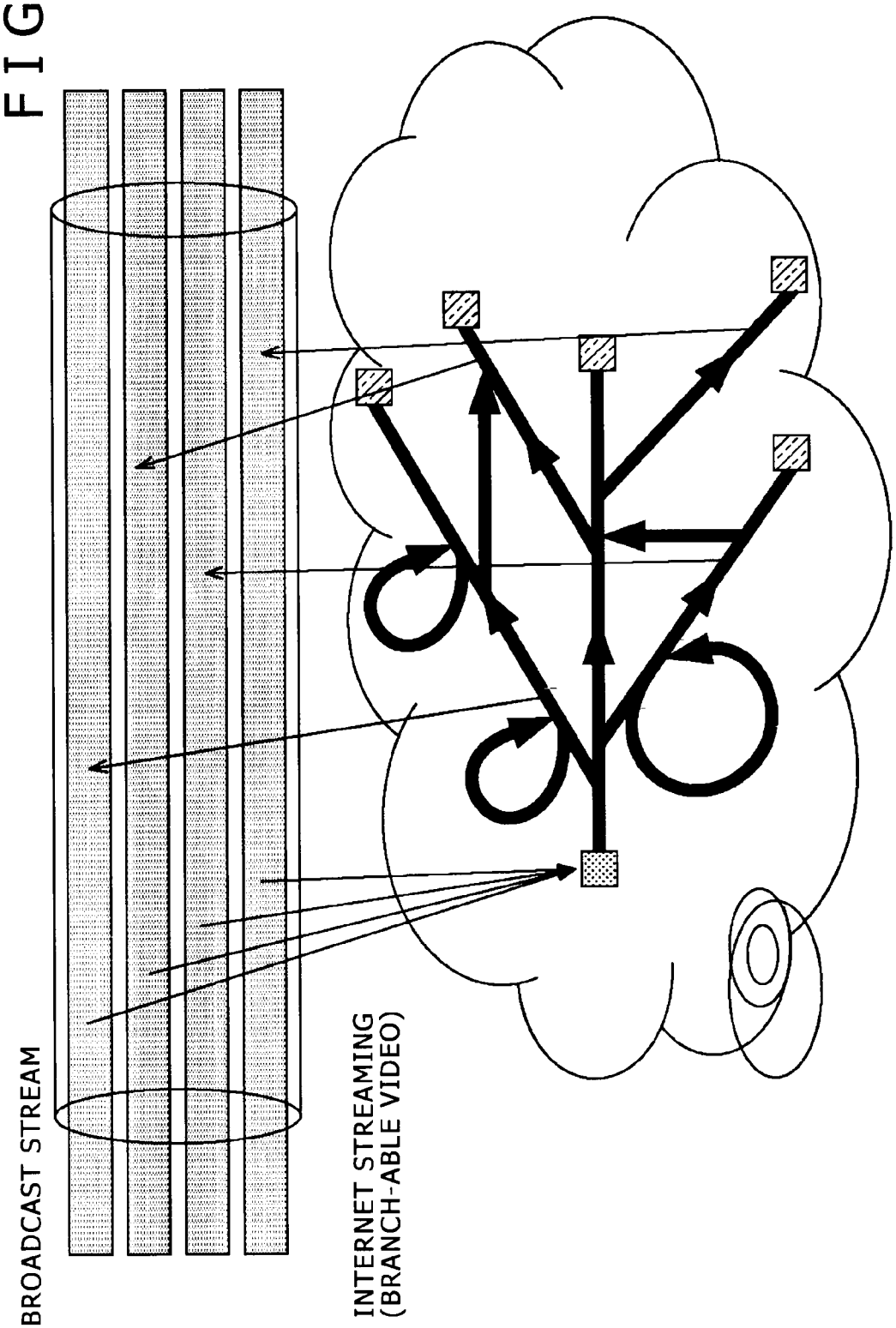
FIG. 4 is a diagram illustrating the coordination between broadcast content and linked content.

Broadcast content such as programs is broadcast by using a broadcast stream in which a plurality of streams, one for each channel, are multiplexed as illustrated in FIG. 4. For example, if a program is linked to linked content to be streamed and reproduced via the Internet, one can move from the linked content to a linked program in the reproduction of the linked content so as to view the program. Conversely, one may move from the program in progress to the linked content at its start point to start the reproduction of the linked content.

As described above, if broadcast content and linked content are linked together using combined telecommunications and broadcasting technologies and coordinated with each other in such a manner that they can be switched from one to another, one can move not only to content to be streamed and reproduced but also to broadcast content, thus providing a variety of pieces of content.

[Configuration Example of the Content Reproduction System]

A description will be given next of a content reproduction system capable of reproducing linked content that can be coordinated with broadcast content with reference to FIGS. 5 to 7.

Figure 5:
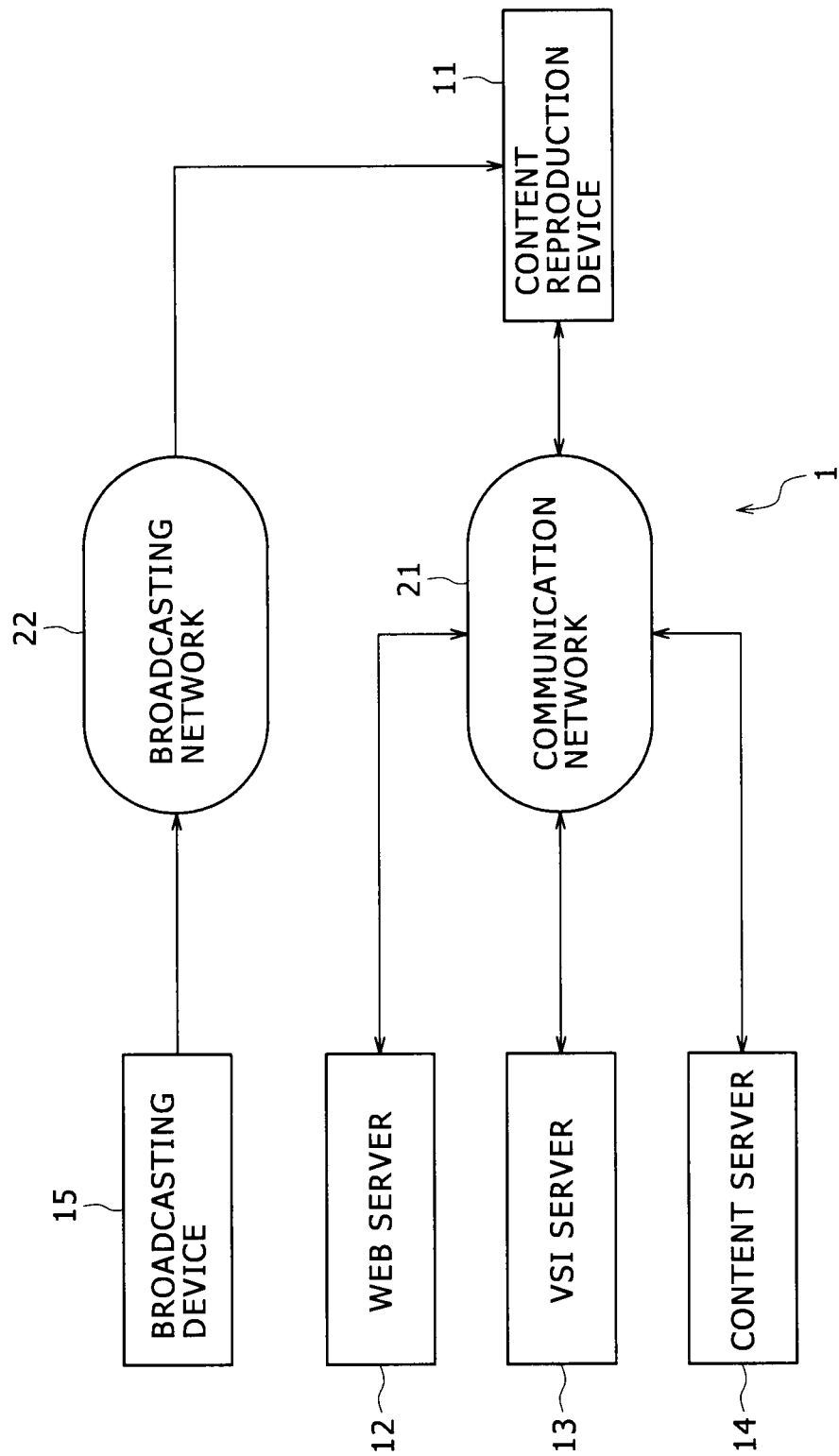
FIG. 5 is a diagram illustrating a configuration example of a content reproduction system according to an embodiment of the present technology.

FIG. 5 is a diagram illustrating a configuration example of a content reproduction system.

A content reproduction system 1 includes a content reproduction device 11, web server 12, VSI server 13, content server 14 and broadcasting device 15.

The content reproduction device 11 is a home video processor such as personal computer, television receiver or DVD recorder, or an information processor such as PDA (Personal Digital Assistant), mobile phone, home or portable music player, or home or portable gaming machine.

It should be noted that the content reproduction device 11 may be a standalone device or incorporated, for example, in a television receiver or home video processor.

The content reproduction device 11 is connected to the web server 12, VSI server 13 and content server 14 via a communication network 21. The same device 11 makes requests to these servers for a variety of information, thus acquiring requested information. The content reproduction device 11 reproduces content data of linked content acquired via the communication network 21.

Further, the content reproduction device 11 incorporates a tuner, thus receiving a digital television broadcasting signal broadcast from the broadcasting device 15 via a broadcasting network 22, displaying an image of content data of broadcast content acquired from the broadcasting signal and outputting its sound.

The web server 12 is a server designed exclusively to provide screens such as lists of content reproduced by the content reproduction device 11. Connected to the content reproduction device 11 via the communication network 21, the same server 12 generates a screen including a list of content provided by the content server 14 and provides the screen to the content reproduction device 11 upon request from the same device 11.

The VSI server 13 is a server designed exclusively to provide VSI information, i.e., control information for each scenario of linked content. Connected to the content reproduction device 11 via the communication network 21, the VSI server 13 provides VSI information to the content reproduction device 11 upon request from the same device 11.

The content server 14 is a server designed exclusively to provide content data for each scenario included in linked content. Connected to the content reproduction device 11 via the communication network 21, the content server 14 provides content data to the content reproduction device 11 upon request from the same device 11.

The broadcasting device 15 is designed to transmit a digital television broadcasting signal via the broadcasting network 22 such as the digital terrestrial broadcasting network. This digital television broadcasting signal is used to achieve the broadcasting of broadcast content such as programs and CMs.

The content reproduction system 1 is configured as described above.

[Configuration Example of the Content Reproduction Device]

Figure 6:
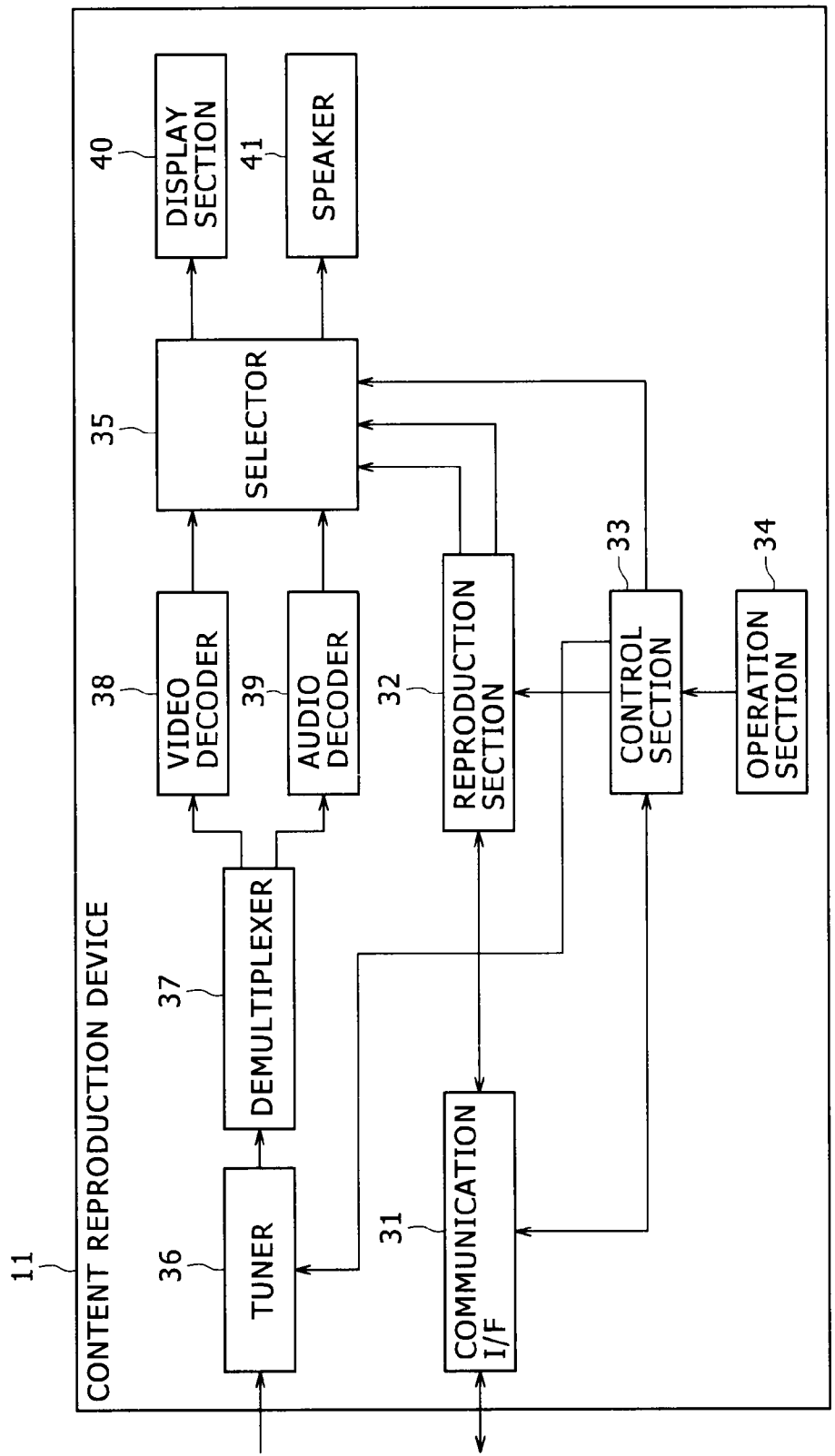
FIG. 6 is a diagram illustrating a configuration example of a content reproduction device shown in FIG. 5.

FIG. 6 is a diagram illustrating a configuration example of the content reproduction device shown in FIG. 5.

The content reproduction device 11 includes a communication I/F 31, reproduction section 32, control section 33, operation section 34, selector 35, tuner 36, demultiplexer 37, video decoder 38, audio decoder 39, display section 40 and speaker 41.

The communication I/F 31 connects to the web server 12, VSI server 13 or content server 14 via the communication network 21 and receives a content list screen, VSI information or content data under control of the control section 33. The communication I/F 31 supplies content data of all the received data to the reproduction section 32 and the content list screen and VSI information to the control section 33.

The reproduction section 32 connects to the content server 14 via the communication I/F 31 and communication network 21 and requests streaming delivery of content data of linked content under control of the control section 33. The same section 32 subjects the content data supplied from the communication I/F 31 to a predetermined process adapted to reproduce the linked content and supplies the resultant video and audio signals to the selector 35.

The control section 33 controls the operation of each of the sections of the content reproduction device 11.

The control section 33 controls the reproduction section 32 according to the VSI information supplied from the communication I/F 31. The control section 33 also controls the selector 35 according to the VSI information.

Further, the control section 33 supplies the content list screen, supplied from the communication I/F 31, to the selector 35.

It should be noted that the control section 33 will be described in detail later.

The operation section 34 supplies to the control section 33 an operation signal appropriate to the user operation. The control section 33 controls the operation of each of the sections of the content reproduction device 11 according to the operation signal supplied from the operation section 34. It should be noted that if an input device (not shown) such as remote controller is used, an operation signal is supplied to the control section 33 from the input device rather than from the operation section 34.

The tuner 36 receives and demodulates the digital television broadcasting signal of the user-selected channel or channel specified by the VSI information and supplies the resultant multiplexed stream to the demultiplexer 37 under control of the control section 33.

The demultiplexer 37 separates coded audio and video signals from the multiplexed stream supplied from the tuner 36 and supplies the coded video signal to the video decoder 38 and the coded audio signal to the audio decoder 39.

The video decoder 38 decodes the coded video signal supplied from the demultiplexer 37 and supplies the resultant video signal to the selector 35.

The audio decoder 39 decodes the coded audio signal supplied from the demultiplexer 37 and supplies the resultant audio signal to the selector 35.

The selector 35 is supplied with video and audio signals from the reproduction section 32, a video signal from the video decoder 38 and an audio signal from the audio decoder 39.

The selector 35 supplies either of the two video signals, one from the reproduction section 32 and another from the video decoder 38, to the display section 40 under control of the control section 33. Further, the selector 35 supplies either of the two audio signals, one from the reproduction section 32 and another from the audio decoder 39, to the speaker 41 under control of the control section 33.

The display section 40 displays the image of the video signal supplied from the selector 35.

The speaker 41 produces the sound of the audio signal supplied from the selector 35.

The content reproduction device 11 is configured as described above.

[Configuration Example of the Control Section]

Figure 7:
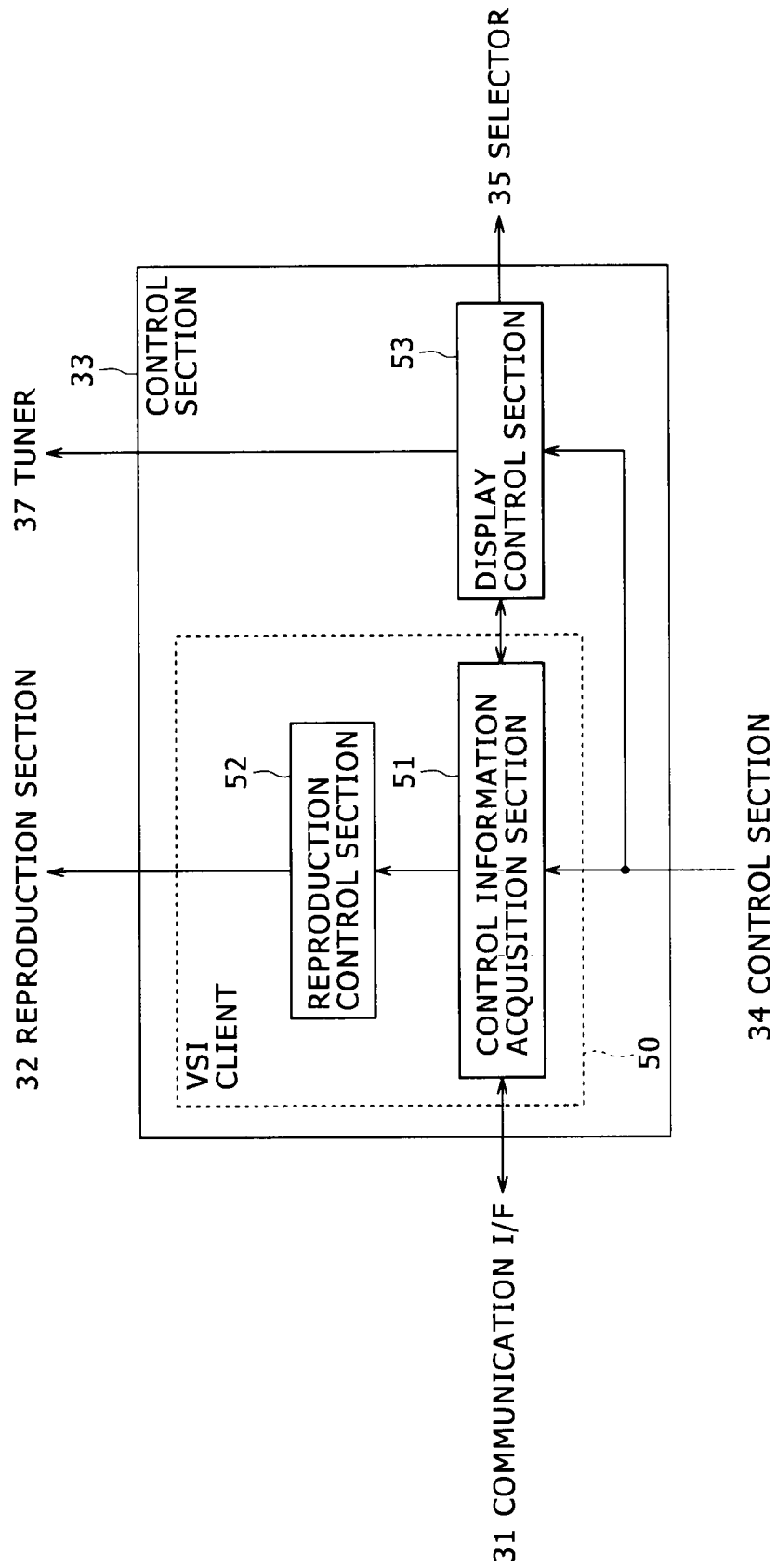
FIG. 7 is a diagram illustrating a configuration example of a control section shown in FIG. 6.

FIG. 7 is a diagram illustrating a configuration example of the control section shown in FIG. 6.

The control section 33 includes a control information acquisition section 51, reproduction control section 52 and display control section 53.

The control information acquisition section 51 acquires VSI information supplied from the communication I/F 31 and supplies the VSI information to the reproduction control section 52 and display control section 53. More specifically, the same section 51 first acquires VSI information for linked content appropriate to the user operation based on the operation signal supplied from the operation section 34. From this point onward, the control information acquisition section 51 acquires the VSI information of the scenario specified according to the VSI information.

It should be noted that if one moves to another event because of an auto event, the control information acquisition section 51 automatically acquires VSI information of the scenario specified by the VSI information. On the other hand, if a scenario is specified by the user using the operation section 34 or an input device rather than moving to another scenario because of an auto event, the control information acquisition section 51 acquires VSI information of the specified scenario. Auto event, i.e., a type of event, will be described later.

The reproduction control section 52 controls the reproduction section 32 according to the VSI information supplied from the control information acquisition section 51, thus controlling the reproduction of linked content.

The display control section 53 controls the selector 35 according to the VSI information supplied from the control information acquisition section 51. More specifically, when linked content is displayed on the display section 40, the display control section 53 switches the input of the selector 35 to the reproduction section 32. When broadcast content is displayed on the display section 40, the display control section 53 switches the input of the selector 35 to the video decoder 38 and audio decoder 39. Further, when broadcast content is displayed, the display control section 53 controls the tuner 36 to select the channel specified by the VSI information.

Still further, the display control section 53 controls the screen display of the display section 40. For example, the same section 53 controls the communication I/F 31 via the control information acquisition section 51 based on the operation signal supplied from the operation section 34, thus connecting to the web server 12 via the communication network 21 and acquiring a list screen of content that can be reproduced. The display control section 53 supplies the acquired content list screen to the selector 35, thus allowing for the screen to be displayed on the display section 40.

The control section 33 is configured as described above.

It should be noted that a VSI client 50 which will be described later includes the control information acquisition section 51 and reproduction control section 52.

[Detailed Configuration of Linked Content]

A description will be given next of the detailed configuration of linked content that can be coordinated with broadcast content reproduced by the content reproduction device 11 with reference to FIGS. 8 to 21.

[Definition of Terms]

Figure 8:
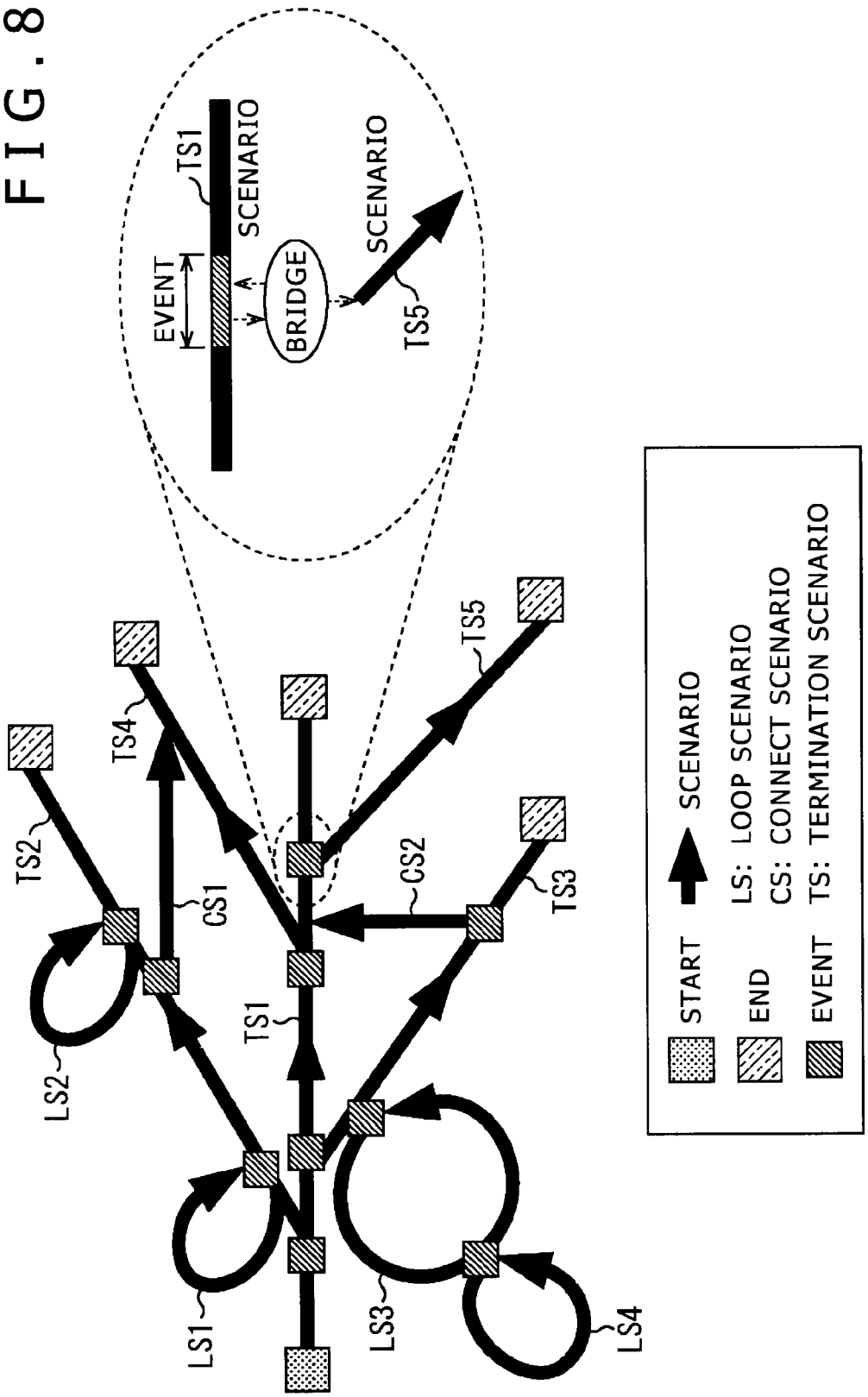
FIG. 8 is a diagram describing the components of linked content reproduced by the content reproduction device.

First, the terms of the constituent elements of linked content will be defined with reference to FIG. 8.

As illustrated in FIG. 8, a scenario consists of a time axis and is part of linked content. Normally, there is only one stream for a scenario. A scenario includes a content file and VSI file. The VSI file is a meta data file for the content file in which VSI information is given. The linked content shown in FIG. 8 includes 11 scenarios from a single start point to a plurality of end points, namely, TS1 to TS5, LS1 to LS4, CS1 and CS2.

It should be noted that a scenario included in linked content is classified primarily by its behavior at the time of its end into one of three types, namely, loop scenario, connect scenario and termination scenario. As illustrated as one of the loop scenarios LS in FIG. 8, a loop scenario refers to a scenario that allows one to move from a point in time of the scenario and return to the same point from which one moved when the reproduction of the scenario ends.

As illustrated as one of the connect scenarios CS in FIG. 8, on the other hand, a connect scenario allows one to move to a scenario different from the scenario from which one moved or to a different point in time of the same scenario when the reproduction of the scenario ends.

Further, as illustrated as one of the termination scenarios TS in FIG. 8, a termination scenario terminates the reproduction of linked content when the reproduction of the scenario ends.

As described above, a scenario means a single unit of reproduction that is reproduced on a single time axis.

An event represents an area of a scenario time space and functions as a link for one to move to another scenario. An event is a time position (time frame) or space position (space frame) specified in the scenario that allows one to move to another scenario. In the linked content shown in FIG. 8, a plurality of events are specified at midpoints in the scenarios between one start point to a plurality of end points. One moves from a current scenario to another as a result of the occurrence of an event.

A bridge is a UI (User Interface) used when a scenario branches. A bridge includes a user confirmation as to whether or not to move to another scenario, operation adapted, for example, to select a scenario if the current scenario is linked to a plurality of scenarios, and specification of the entire screen display. As the linked content is shown partially in an enlarged scale in FIG. 8, when an event occurs at some midpoint of the termination scenario TS1, a bridge screen appears to move to the termination scenario TS5. When the termination scenario TS5 is specified by the user operation, the user moves from the termination scenario TS1 to the termination scenario TS5.

A branch indicates a destination scenario as opposed to the scenario in question. In the linked content shown in FIG. 8, the scenarios TS2, TS3, TS4 and TS5 are branch scenarios for the scenario TS1. On the other hand, the scenarios LS1, CS1 and LS2 are branch scenarios for the scenario TS2 which is a branch scenario for the scenario TS1.

[Configuration Example of VSI Information]

Figure 9:
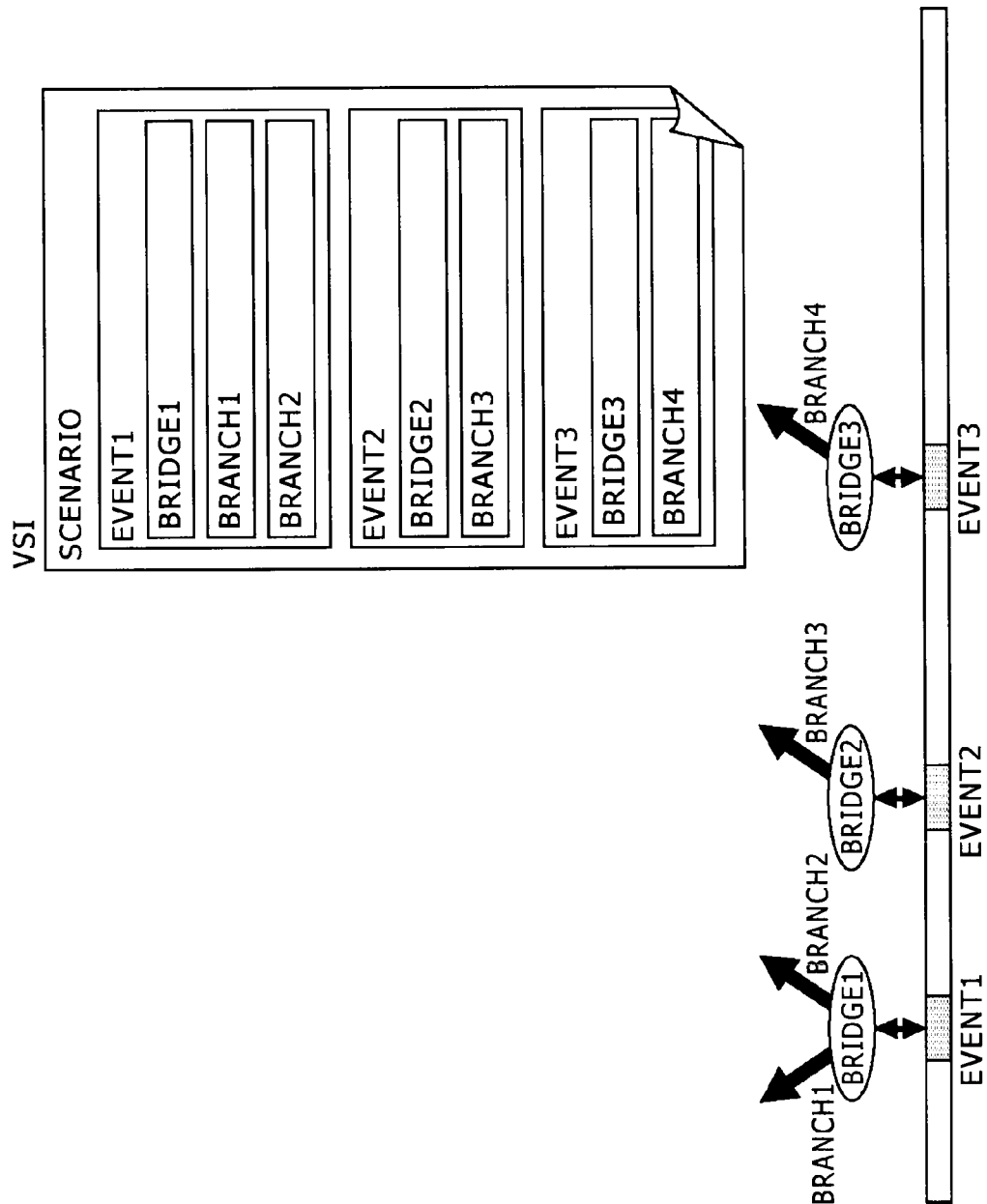
FIG. 9 is a diagram illustrating a configuration example of VSI information.

A detailed description will be given next of the content of VSI information. As described above, linked content includes a plurality of scenarios, each made up of content data and VSI information, i.e., control information about the reproduction of content data. Here, VSI information is prepared for each scenario as illustrated in FIG. 9 and supplied, for example, in the form of an XML (Extensible Markup Language).

VSI information includes information (e.g., URL (Uniform Resource Locator) of content data of the scenario in question) required to activate the reproduction of the scenario in question, a plurality of event elements relating to an event for the user to move from the current scenario to another, a token element for user authentication and so on.

Event elements include at least either of the time frame and space frame in which a move to a branch scenario is enabled, a bridge element relating to a bridge that defines the user interface used to move to another scenario, and one or a plurality of branch elements relating to branches indicating other scenarios.

The bridge element includes information defining the UI used when a scenario branches.

The branch element includes information (e.g., URL of VSI information of the branch scenario) required to move to a branch scenario to which the scenario in question branches. VSI information of a branch scenario includes similar information. For example, VSI information of a branch scenario may include information required to move from one branch scenario to another branch scenario branching therefrom.

Here, the detailed specification of VSI information is illustrated in FIGS. 10 to 13. FIG. 10 is a table illustrating the overall specification of VSI information.

VSI information is prepared for each scenario and primarily includes meta data relating to the scenario, event elements relating to branch events included in the scenario and a token element.

Meta data relating to a scenario includes information used to identify the scenario, information used to identify the provider that provides the scenario, information used to identify content data of the scenario or media type information of the scenario. Attaching media type information of the scenario allows for the content reproduction device 11 to reference the media type information in controlling the reproduction, thus making the same device 11 compatible with a plurality of media types.

On the other hand, the event element included in a scenario is further defined by the specification shown in FIG. 11. The event element includes meta data relating to the event, bridge element used in the event, and branch element relating to the branch scenario to which one can move from the event in question.

FIG. 12 illustrates a further detailed specification of the bridge element included in the event element. The bridge element is information that defines the user interface used when the event is activated. Therefore, the bridge element includes information required to display a bridge screen.

On the other hand, FIG. 13 illustrates a further detailed specification of the branch element included in the event element. One or a plurality of branch elements are included in the event element. Further, scenario media type information, for example, is also included in the branch element. Attaching scenario media type information makes it possible to specify the media type of the scenario to which one branches.

It should be noted that although information relating to each branch on the bridge screen such as font size, font type and font color is included in the bridge element, the present technology is not limited thereto. Instead, such information may be included, for example, in each branch element.

[Scenario Type]

A description will be given next of the scenario types included in linked content reproduced by the content reproduction device 11.

Linked content reproduced by the content reproduction device 11 basically includes a plurality of scenarios linked together. At this time, moving image, still image, slideshow, application and broadcasting are, for example, used as content data for each scenario.

The reproduction of a scenario continues from the start of the reproduction of content data of the scenario until branching, interruption or termination of that scenario occurs. Among the operations of the remote controller likely used in the reproduction of a scenario are Stop, Enter, Pause, FF, FR, Skip and Play.

The Stop operation is designed to interrupt the reproduction. If performed, the Stop operation interrupts the reproduction of linked content, bringing the screen back to the screen before the linked content is activated.

The Enter operation is designed, for example, to check for a branch to another scenario in the time frame (or space frame) for the event. If performed in the time frame (or space frame) for the event, the Enter operation displays a bridge screen.

The Pause, FF and FR operations are identical to those performed in the reproduction of ordinary content. That is, the Pause operation temporarily stops the reproduction of content being reproduced. On the other hand, the FF and FR operations are optional. If the FF and FR operations are supported by content, the FF operation fast-forwards content being reproduced, and the FR operation fast-rewinds content being reproduced.

If performed in the reproduction of content, the Skip operation allows one to skip to the scene at the beginning of the next event. The Play operation is used to resume the reproduction of a scenario temporarily stopped by the Pause operation in the reproduction.

Further, as described above, scenario content data is classified by media type, and moving image, still image, slideshow, application and broadcasting are, for example, used.

A moving image scenario includes moving image content made up of moving images and sounds. At this time, moving images are compatible with at least either 2D (Dimensional) or 3D content.

In the reproduction of a moving image scenario on the other hand, it is preferred to exit from the scenario in question after the last moving image is displayed, for example, by moving to the original scenario or terminating the linked content. Further, if an event is specified by VSI information, performing the Enter operation within the target time (or target space) of the event displays a bridge screen to go to the other specified scenario.

A still image scenario is a scenario made up of a single still image in JPEG (Joint Photographic Experts Group) or other format. When a still image scenario is reproduced, the still image, i.e., content data, is displayed over the entire screen of the display section 40. Although the classification by scenario link type will be described later, a still image scenario is applicable to scenarios of all link types. The user exits from a still image scenario by performing the Enter operation in the reproduction of the scenario. On the other hand, if an event is specified by VSI information of a still image scenario, a bridge screen appears to go to the other specified scenario when the user performs the Enter operation.

A slideshow scenario includes one or a plurality of still images. When a slideshow scenario is reproduced, the still image or images, i.e., content data, are displayed over the entire screen of the display section 40. Then, the still images are sequentially switched from one to another at predetermined time intervals. When the last still image included in the slideshow content data is displayed, the reproduction of the scenario in question is terminated, for example, by returning to the original scenario or terminating the linked content.

Further, an application scenario includes an application. Among types of applications used here are Widget applications and Java (registered trademark) applications.

A broadcast scenario includes broadcast content received from the broadcasting device 15 via the broadcasting network 22 and is defined only as a branch scenario. When a branch occurs to a broadcast scenario, broadcast content is displayed on the display section 40.

Figure 14:
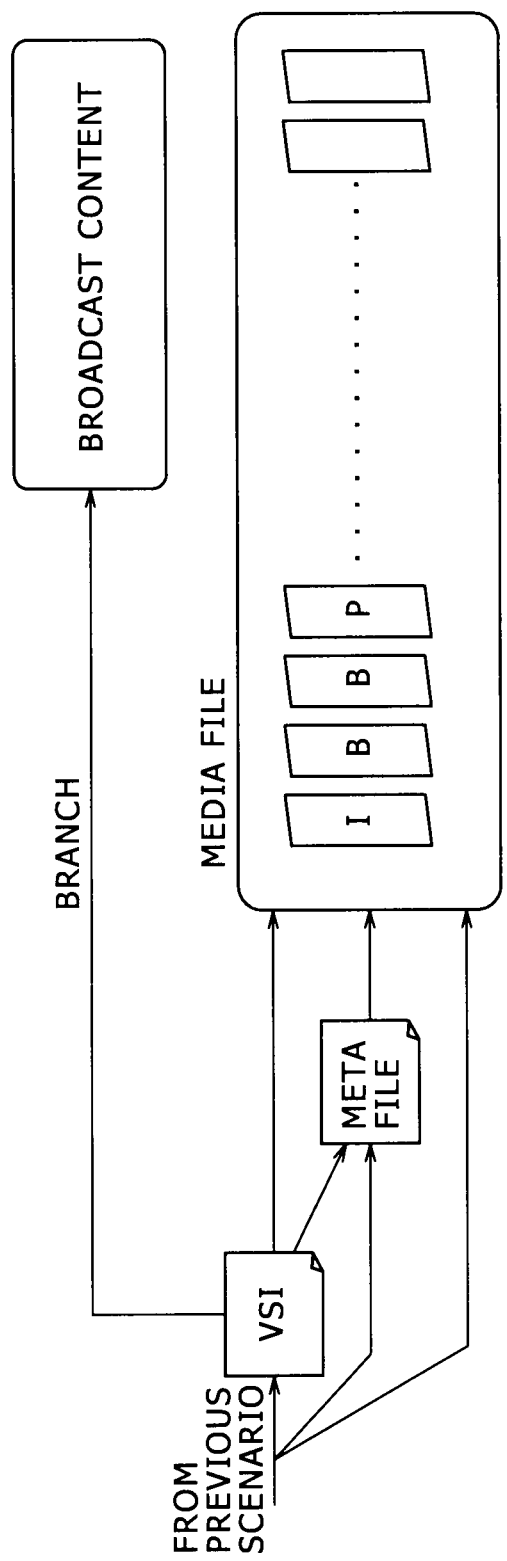
FIG. 14 is a diagram describing a broadcast scenario classified by media type.

As illustrated in FIG. 14, broadcast scenario is defined by the branch element in VSI information. More specifically, a specific channel is specified by including a URI (Uniform Resource Identifier) relating to broadcasting in the location attribute of the entry element under the branch element in VSI information shown in FIG. 13. This URI starts with a scheme such as "dvb" or "arib," delimited by a colon and followed by a format defined for each scheme to represent the resource.

When a branch occurs to a broadcast scenario, it is preferred to exit from the broadcast scenario, for example, by terminating the linked content after broadcast content of a specific channel is selected and displayed.

[Event Types]

A description will be given next of event types with reference to FIGS. 15 to 20.

Events can be classified into five types, namely, time event, space event, time-space event, absolute time-of-day event and absolute time-of-day-time event. Further, an event is basically designed to allow for the user to move to other scenario by user operation in the frame defined by time or space. However, an auto event is also defined that allows the user to automatically move from one scenario to another regardless of user operation.

Figure 15:
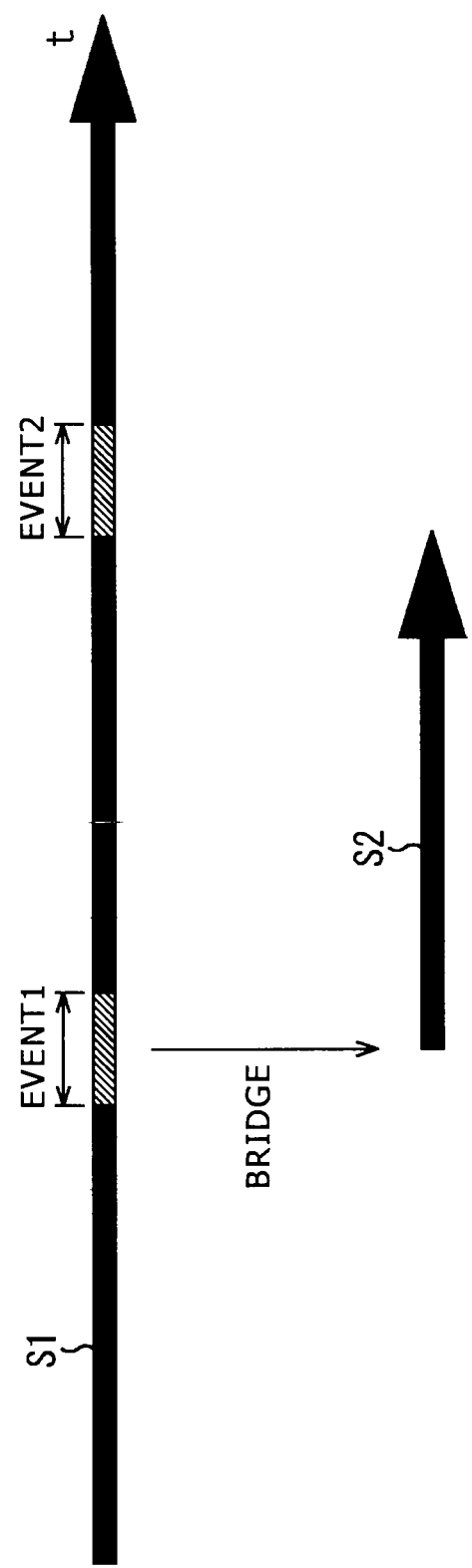
FIG. 15 is a diagram describing a time event.

First, the term "time event" refers to a time frame delimited by start and end points on the scenario time axis. In VSI, a time event is defined by start and end points. For example, if a scenario S1 is linked to a scenario S2 by an Event 1 as illustrated in FIG. 15, and if the user performs the Enter operation in the reproduction of the scenario S1, it is determined whether or not the point in time when the user performed the Enter operation falls within the event period specified by VSI. Then, when it is determined that the point in time falls within the event period specified by VSI, the bridge screen specified by the VSI information appears, followed by the reproduction of the other scenario S2 specified by the user operation.

Figure 16:
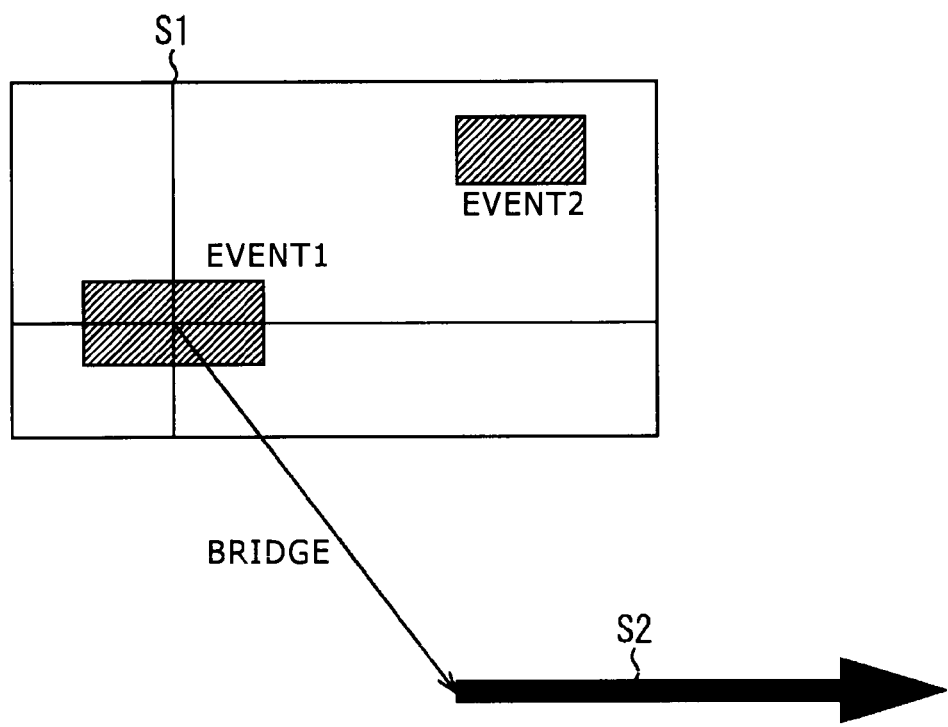
FIG. 16 is a diagram describing a space event.

A space event is an event represented by an area in the space of the scenario screen. A space event is defined by the upper left and lower right coordinates of a rectangular area in VSI information. A space event is primarily used when the scenario is a still image scenario. Alternatively, in the case of a moving image scenario, an event is referred to as a space event if the event is enabled in the entire time period of the scenario. For example, two events, i.e., the Events 1 and 2, are defined in the still image scenario S1 as shown in FIG. 16. When the user performs the Enter operation in the reproduction of the still image scenario S1, it is determined whether or not the cursor position at this point in time falls within the rectangular area of the event defined by VSI. Then, when it is determined that the cursor position falls within the event area, the bridge screen specified by the VSI appears. Then, if a scenario is specified here by the user operation, the reproduction of the other scenario S2 specified by the user operation begins.

Figure 17:
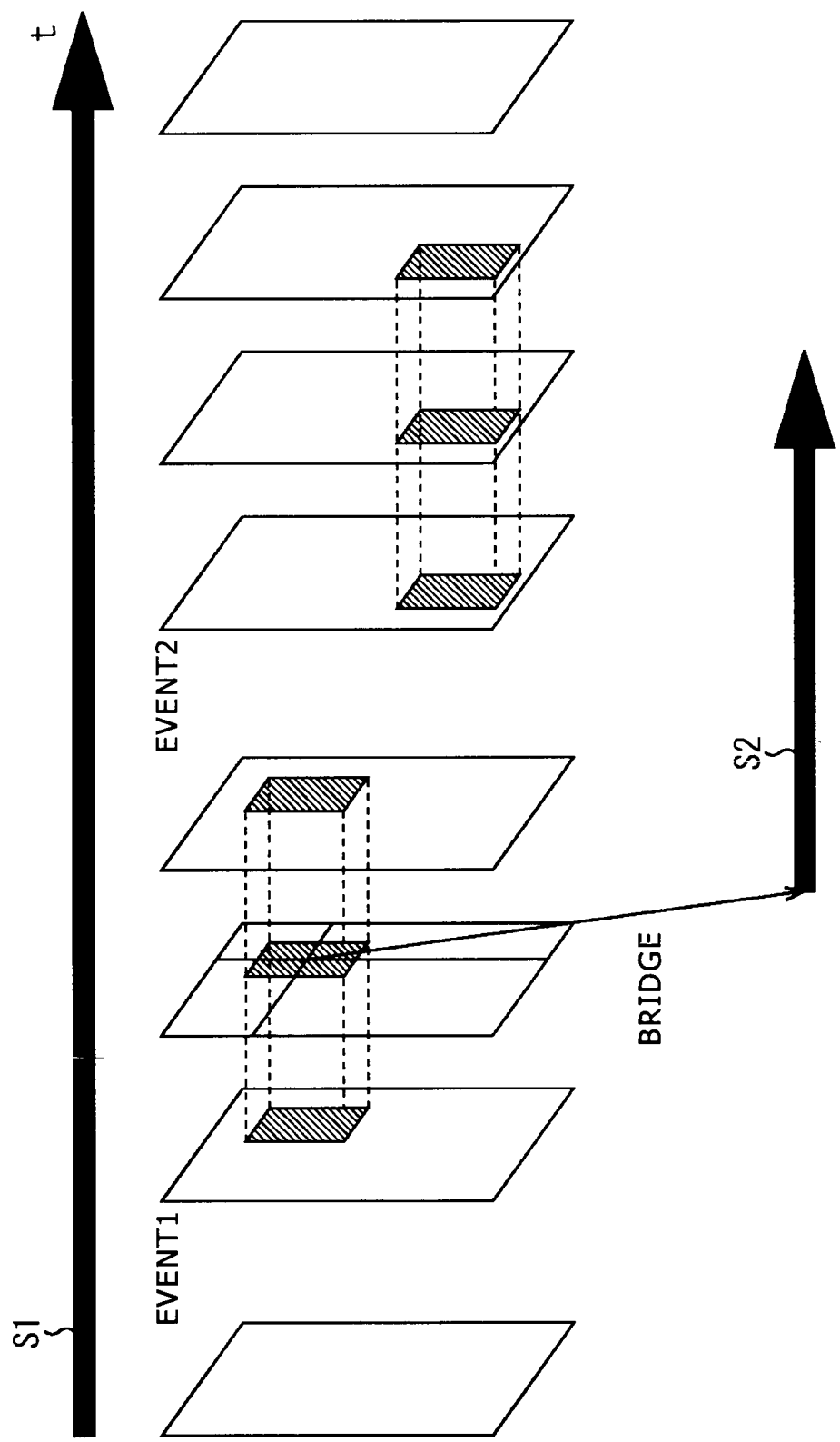
FIG. 17 is a diagram describing a time-space event.

A time-space event is an event represented by a rectangular area in the screen space within the time on the scenario time axis. In VSI, a time-space event is defined by a combination of start and end points on the time axis and the upper left and lower right coordinates of a rectangular area in the screen. A time-space event is enabled only in a moving image scenario having the concept of time and space. FIG. 17 illustrates the time-space Events 1 and 2 in the scenario S1. When the user performs the Enter operation in the reproduction of the scenario S1, it is determined whether or not the point in time when the user performed the Enter operation falls within the event time frame specified by VSI, and whether or not the cursor position at that point in time falls within the event space frame defined by VSI. Then, when it is determined that the point in time and the cursor position falls respectively within the event time and space frames, the bridge screen specified by VSI appears. Then, if a scenario is specified here by the user operation, the reproduction of the other scenario S2 specified by the user operation begins.

On the other hand, the cursor may appear on the screen if, for example, a space or time-space event is recognized in VSI information. Although the manner in which this cursor appears is implementation-dependent, the cursor can be moved on the screen by using, for example, the up, down, left or right key on the operation section 34 or an input device such as a remote controller.

Figure 18:
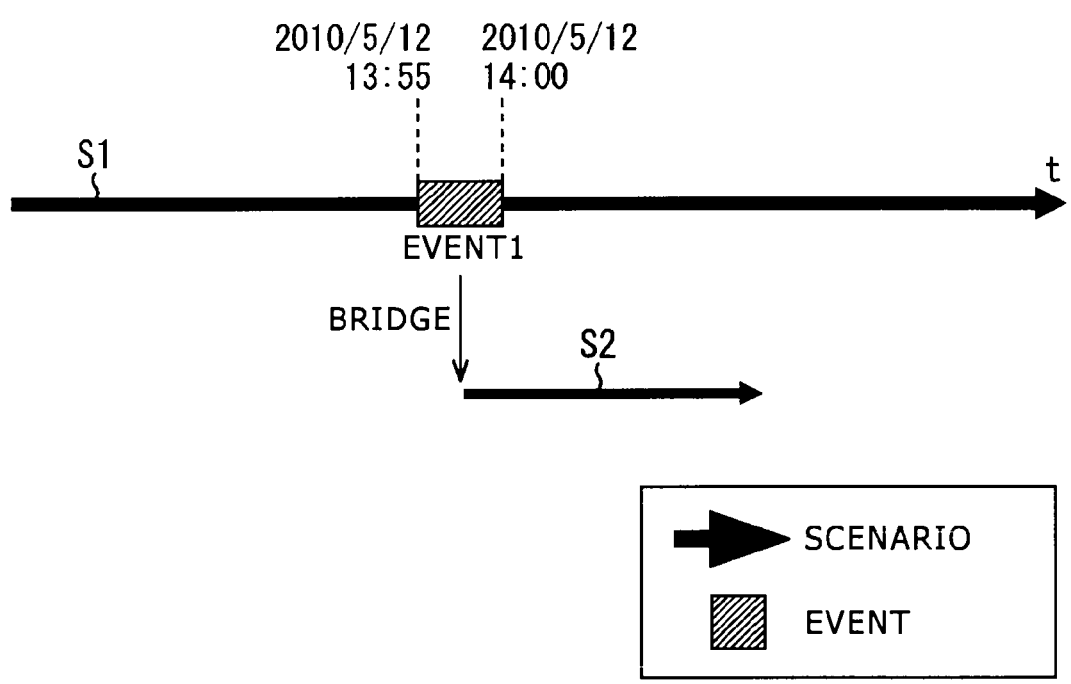
FIG. 18 is a diagram describing an absolute time-of-day event.

An absolute time-of-day event is an event that occurs at a preset specific date and time irrespective of the progress of the scenario. For example, if "2010/5/12 13:55" and "2010/5/12 14:00" are set respectively in the start_time and end_time attributes of the absolute_timeframe element under the event element shown in FIG. 11 as illustrated in FIG. 18, the Event 1, i.e., an absolute time-of-day event, occurs and lasts for five minutes from 13:55 to 14:00 on May 12, 2010. In this case, when the user performs the Enter operation in the reproduction of the scenario S1, it is determined whether or not the point in time when the user performed the Enter operation falls within the time frame from 13:55 to 14:00 on May 12, 2010. Then, when it is determined that the point in time falls within the time frame, the bridge screen appears. Then, if a scenario is specified here by the user operation, the reproduction of the other scenario S2 specified by the user operation begins.

Figure 19:
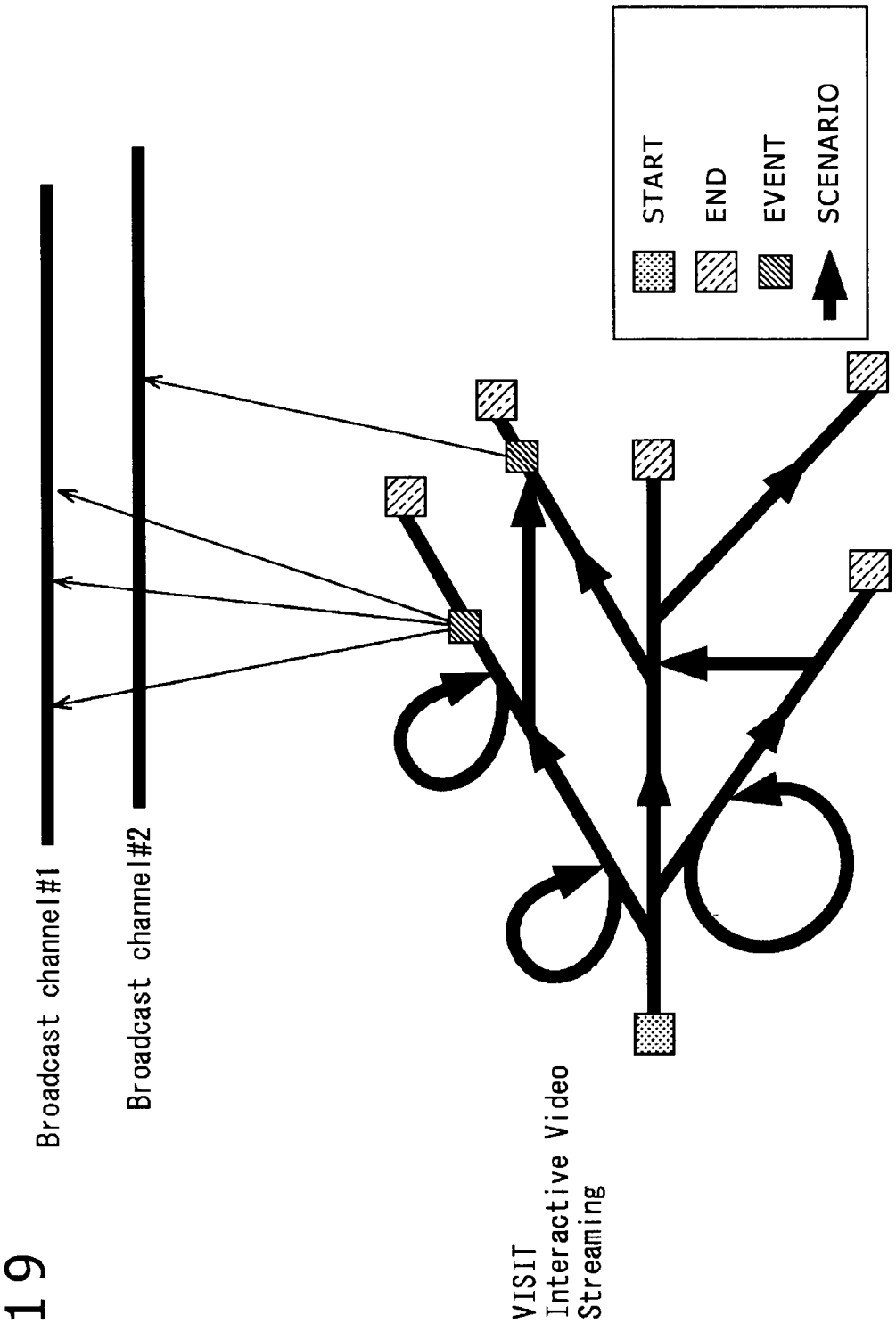
FIG. 19 is a diagram describing the coordination between linked content and broadcast content.

At this time, the scenario S2 to which the scenario S1 branches may be, for example, a broadcast scenario. That is, if an absolute time-of-day event occurs in the middle of the scenario as illustrated in FIG. 19, and when broadcast content of an arbitrary channel is selected from the bridge screen, the linked content is switched over to broadcast content, thus allowing for the broadcast content to be displayed. The broadcast content displayed here may be broadcast content of a specific channel being broadcast at the time of switching or broadcast content broadcast at a specific time of the day. On the other hand, if the user wishes to switch to broadcast content when a program begins, it is only necessary to cause an absolute time-of-day event to occur immediately before the broadcast program begins.

An absolute time-of-day-time event is an absolute time-of-day event that occurs only in a time event in a predetermined time frame delimited by start and end points on the scenario time axis. In other words, an absolute time-of-day-time event can be said to be an event that occurs only if the AND conditions between time and absolute time-of-day events are met. In the case of FIG. 18, for example, even if the current time falls within the time frame from 13:55 to 14:00 on May 12, 2010, but if the current time falls outside the time frame delimited by the start and end points on the scenario time axis defined by the time event, an absolute time-of-day-time event does not occur. More specifically, for example, even if the user is at a specific location in a studio which is a virtual space, it is possible to implement a scenario that guides the user into the theater located at the back of the studio when a specific time such as starting time of the program is reached and the absolute time-of-day event occurs.

As described above, it is possible to cause an event to occur by using an absolute time-of-day-time event at a specific scene irrespective of the progress of the scenario when a specific time of the day is reached.

A description has been given above of time event, space event, time-space event, absolute time-of-day event and absolute time-of-day-time event, namely, events that allow the user to move to other scenario primarily by the user operation. However, an auto event, i.e., an event that allows the user to automatically move to other scenario, is also defined in addition to those events that allow the user to move to other scenario by the user operation. A description will be given next of this auto event.

An auto event allows the user to automatically move to other scenario regardless of user operation. If an auto event is defined in VSI and when it is recognized that the current time falls within the time frame defined by the auto event, the reproduction of the scenario in question is automatically interrupted regardless of user operation, thus displaying a bridge screen and allowing the user to move to other scenario.

In the scenario S1 shown in FIG. 20, for example, the Event 1, i.e., au auto event, is defined. When it is recognized that, while the scenario S1 is reproduced, the current time falls within the time frame for the Event 1 specified by the VSI information of the scenario S1, the bridge screen defined by the VSI information appears, after which the reproduction of the scenario S2 begins automatically.

As described above, in the scenario S1, the Event 1, an auto event, is used, for example, to replace the moving images from a given point in time onward. Further, the scenario to which the user moves from an auto event may be, for example, a broadcast scenario. In this case, for example, even if the user is at a specific location in a studio which is a virtual space, it is possible to implement a scenario that causes an absolute time-of-day-time event to occur, forcefully guides the user into the theater located at the back of the studio by using an auto event, and starts the viewing of broadcast content in the theater when a specific time such as starting time of the program is reached.

[Bridge Patterns]

Figure 21:
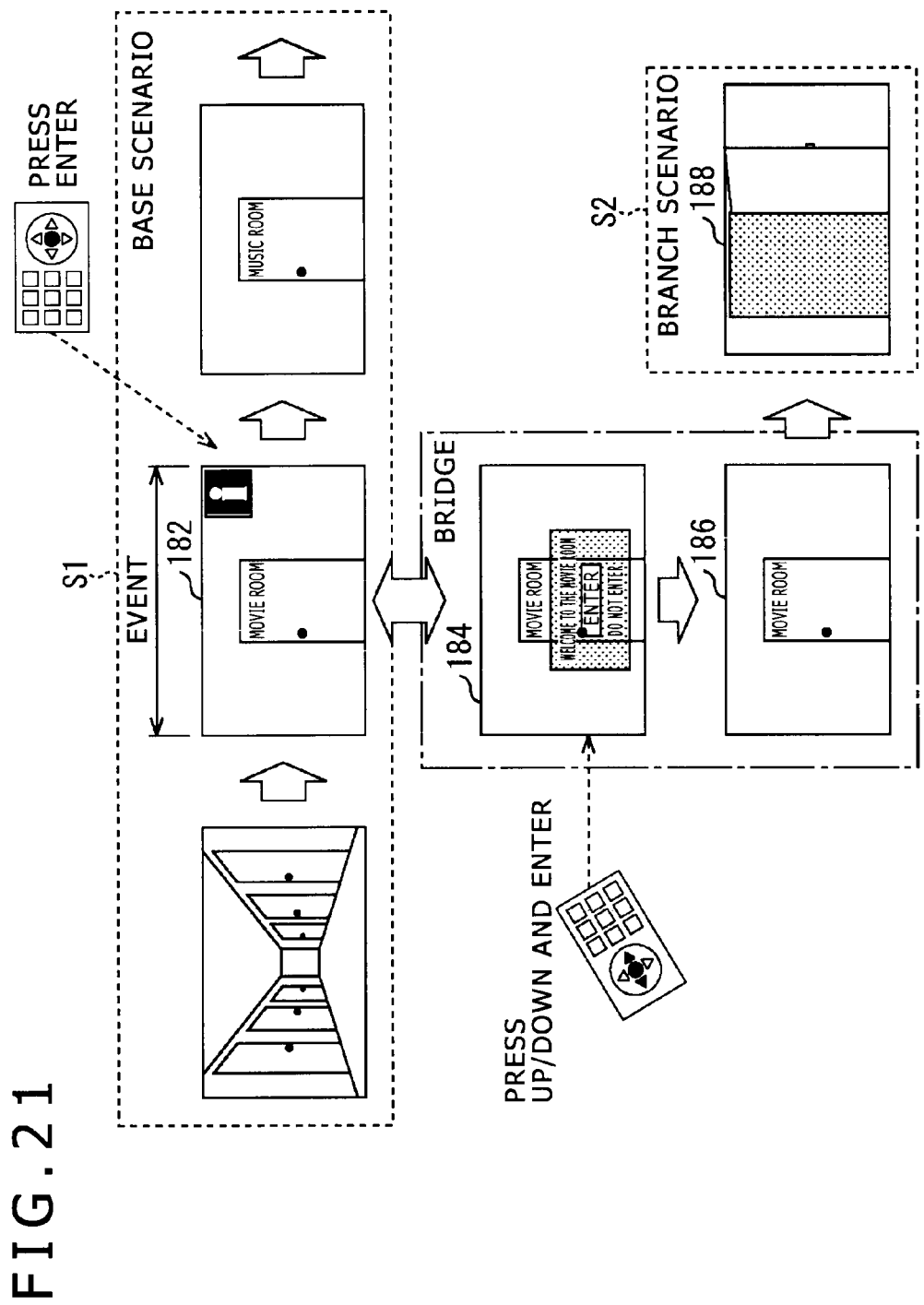
FIG. 21 is a diagram illustrating an example of a bridge screen.

A description will be given next of a bridge included in the event element with reference to FIG. 21. FIG. 21 illustrates an example of a bridge.

A bridge is a UI used when a scenario branches to another scenario. The bridge element in the VSI information is defined for each event. The bridge element defines the screen provided at the time of branching from one scenario to another when the user performs an input operation in the event area or when the user enters the event area in an auto event.

In the example shown in FIG. 21, for example, if the user performs the Enter operation in an event screen 182, i.e., an event area, in the reproduction of content data of the scenario S1, i.e., the base scenario, a first bridge screen 184 defined by the bridge element appears.

In the first bridge screen 184 shown in FIG. 21, the screen configuration thereof, which includes a user interface for user operation, defined by the bridge element, displays two options, one adapted to move to the branch scenario S2 and another adapted to return to the original base scenario. Here, if the user selects the option adapted to move to the branch scenario S2 by the user input operation, a second bridge screen 186 appears that is devoid only of the option UI. Then, when the setup is completed to initiate the reproduction of the branch scenario S2, the reproduction of the branch scenario S2 begins, thus displaying a branch scenario start screen 188.

[Example of Operation of the Content Reproduction System]

Figure 23:
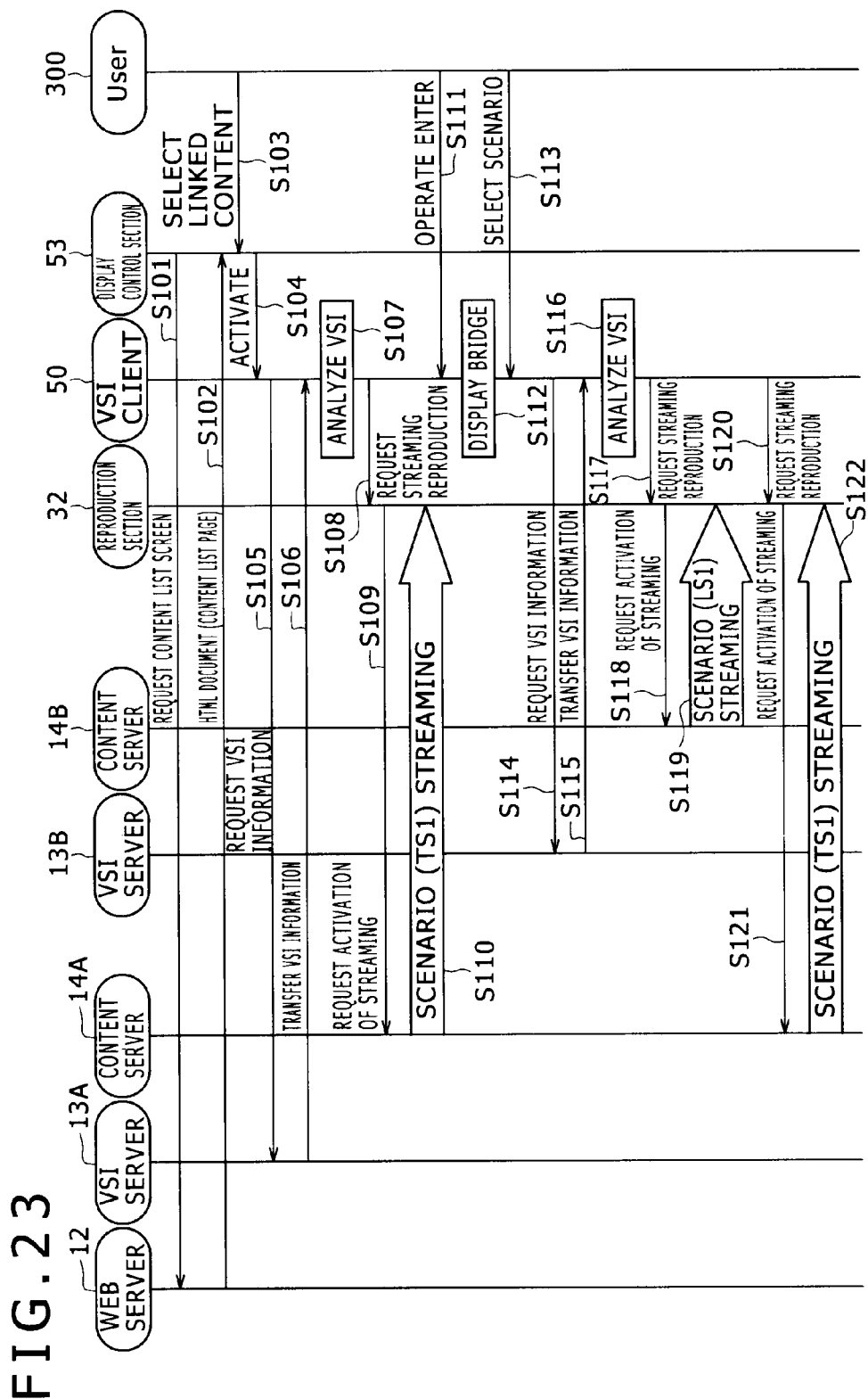
FIG. 23 is a sequence diagram illustrating the operation of the scenario example shown in FIG. 22.

FIG. 22 is an explanatory diagram illustrating an example of linked content, and FIG. 23 is a sequence diagram illustrating an example of operation adapted to reproduce the linked content shown in FIG. 22.

The linked content shown in FIG. 22 has the termination scenario TS1, i.e., a base scenario, and the loop scenario LS1. The loop scenario LS1 branches from an event at a given point in time of the termination scenario TS1. The content data and VSI information of the termination scenario TS1 and those of the loop scenario LS1 are provided respectively by the different VSI servers 13 and different content servers 14.

First, the display control section 53 of the content reproduction device 11 requests a content list screen to the web server 12 (S101). Then, the server 12 provides an HTML document including the content list in response to the request from the content reproduction device 11 (S102). Here, when a user 300 who has viewed the provided content list screen performs an operation adapted to select linked content (S103) from the content list, the display control section 53 activates the functionality of the VSI client 50 (S104). It should be noted that the VSI client 50 conceptually includes the functionality of the control information acquisition section 51 and reproduction control section 52 in FIG. 7 as described above.

Then, the VSI client 50 requests VSI information for the linked content specified by the user 300 to a VSI server 13A in response to a request from the display control section 53 (S105). In response to the request for the VSI information from the VSI client 50, the VSI server 13A transfers VSI information for the scenario TS1 to be reproduced first of all the linked content given in this request message (S106). Then, the VSI client 50 that has received the VSI information analyzes the received VSI information (S107). The VSI information includes information indicating where the content data of the scenario in question is stored. The VSI client 50 inputs a request for streaming reproduction into the reproduction section 32 together with the information indicating the storage location of the content data (S108).

The reproduction section 32 requests the activation of streaming to a content server 14A based on the information received from the VSI client 50 (S109). The content server 14A initiates the streaming delivery of content data for the specified scenario TS1 in response to the request for activation of streaming (S110). On the other hand, when the user 300 performs the Enter operation in the reproduction of the scenario TS1 by streaming delivery (S111), the VSI client 50 controls the bridge screen display based on the bridge element included in the VSI information (S112). Here, the bridge screen displays two options, one adapted to move to the loop scenario LS1, i.e., the branch scenario, and another adapted to return to the termination scenario TS1, i.e., the original base scenario.

When the user 300 performs an operation adapted to select the branch scenario in the bridge screen (S113), the VSI client 50 requests the VSI information for the loop scenario LS1, i.e., the branch scenario selected by the user 300, to a VSI server 13B (S114). The VSI server 13B transfers the VSI information for the specified scenario LS1 to the VSI client 50 in response to the message requesting the VSI information (S115).

The VSI client 50 that has received the VSI information analyzes the received VSI information (S116). Then, the VSI client 50 acquires the storage location of the content data of the loop scenario LS1, i.e., the branch scenario, from the VSI information, thus inputting a request for streaming reproduction into the reproduction section 32 together with the information indicating the storage location of the content data (S117). At this time, the VSI client 50 retains the information at the time of the move and the VSI information of the base scenario TS1. The reproduction section 32 transmits a request for activation of streaming of the loop scenario LS1 to a content server 14B in response to this request for reproduction (S118).

The content server 14B initiates the streaming of the specified scenario LS1 in response to the request for activation of streaming (S119). When the reproduction of the scenario LS1 ends, the VSI client 50 automatically initiates the reproduction of the original base scenario TS1. More specifically, the VSI client 50 controls the reproduction section 32 to resume the reproduction of the base scenario TS1 from the point of the move using the information at the time of the move and the VSI information of the base scenario TS1 retained by the same client 50 (S120).

It should be noted that, in the example shown in FIG. 23, the VSI client 50 retains the VSI information itself of the base scenario TS1. This makes it possible for the VSI client 50 to resume the reproduction of the base scenario TS1 without acquiring the VSI information again after the end of the reproduction of the loop scenario LS1, i.e., the branch scenario. In contrast, it is possible for the VSI client 50 to retain only the information about the storage location of the VSI information to suit the performance of the content reproduction device 11. In this case, the VSI client 50 can resume the reproduction of the base scenario TS1 by acquiring the VSI information again based on the retained information about the storage location.

The reproduction section 32 requests the activation of streaming of content data of the base scenario TS1 from the point in time of the move to the content server 14A under control of the VSI client 50 (S121). Then, the content server 14A resumes the streaming delivery of the base scenario TS1 in response to this request (S122).

Figure 24:
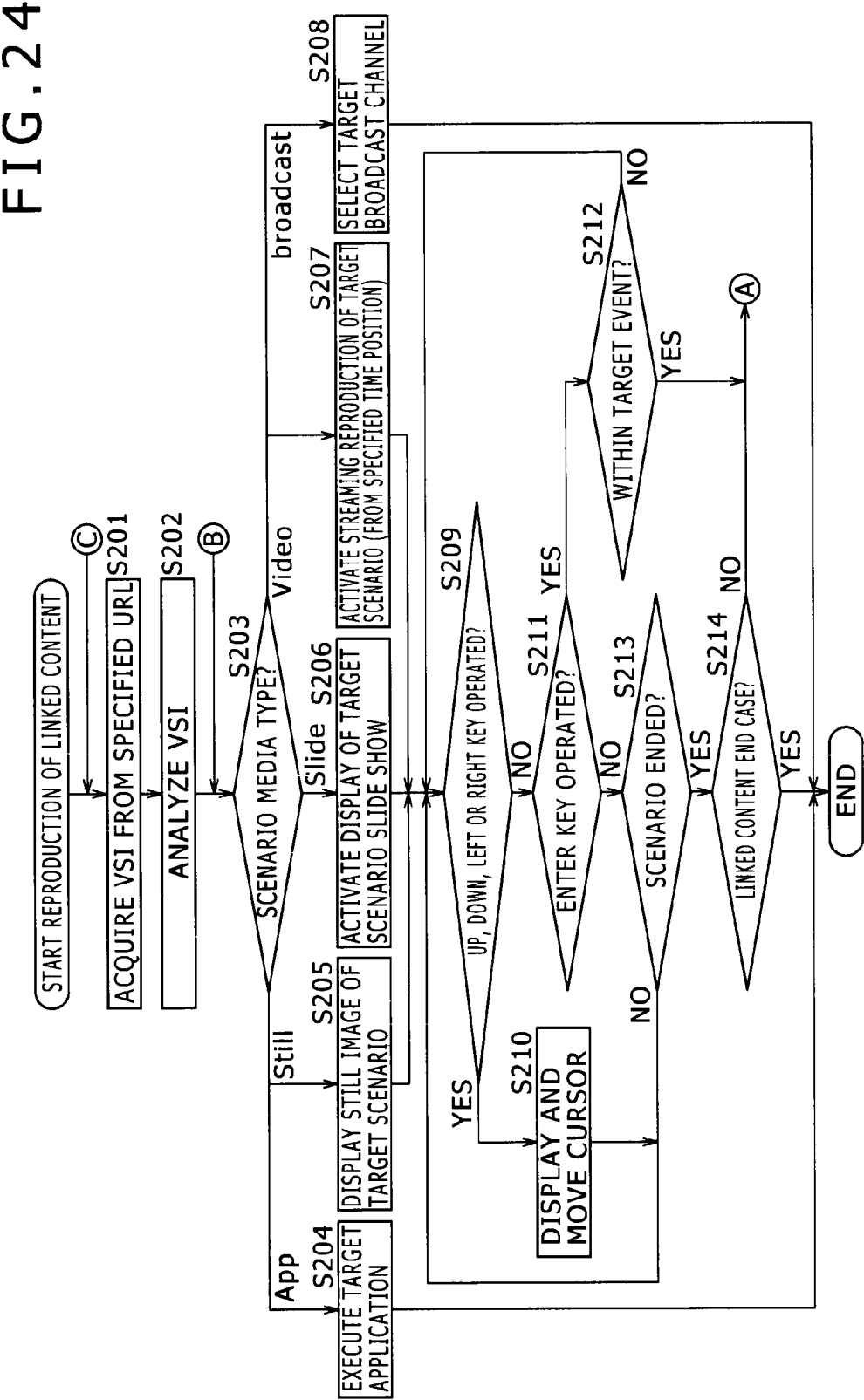
FIG. 24 is a flowchart describing the reproduction of linked content.
Figure 25:
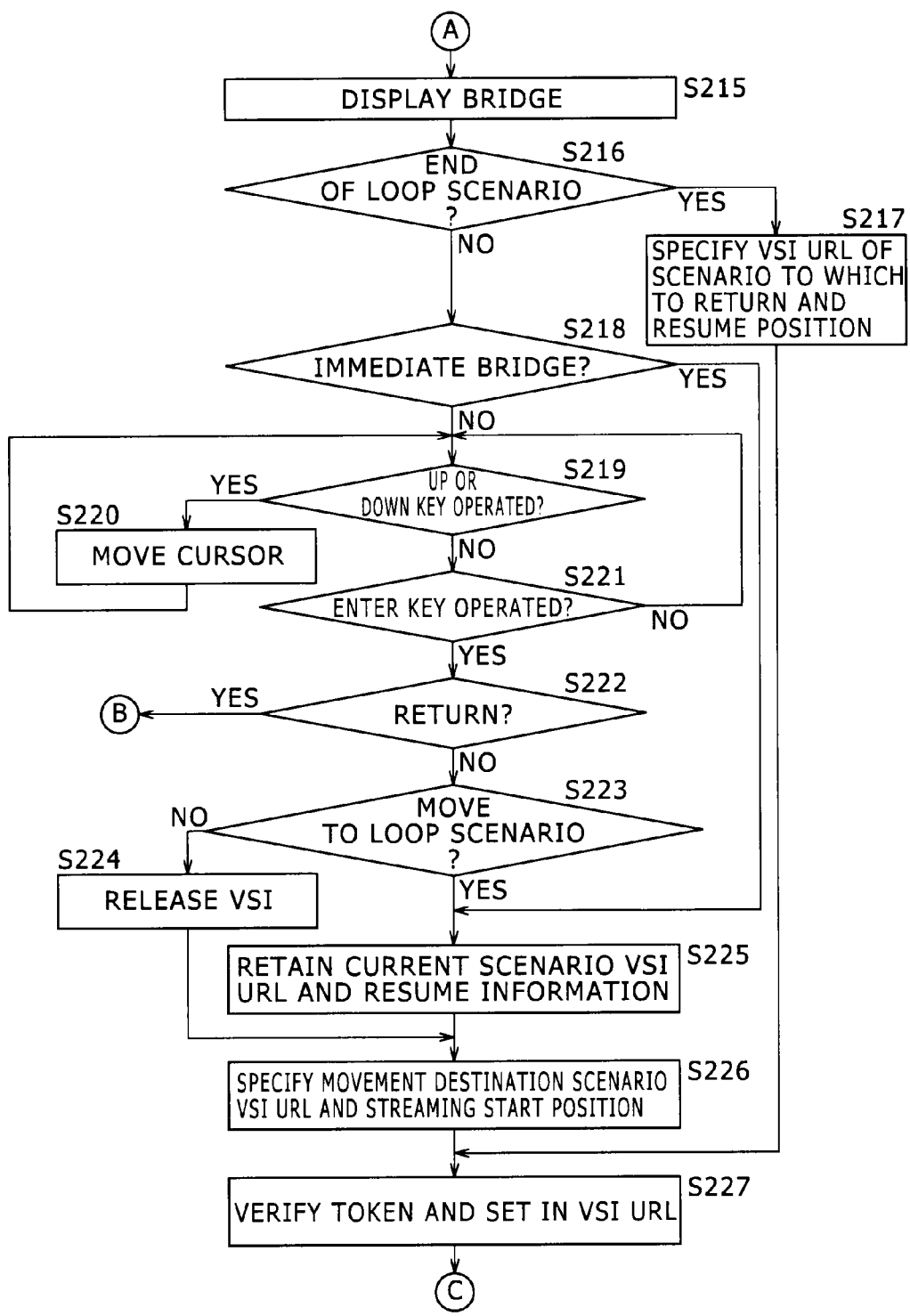
FIG. 25 is a flowchart describing the reproduction of linked content.

A description has been given above of the operation of the content reproduction system 1 in relation to an example of linked content shown in FIG. 23. A description will be given next of the operation of the content reproduction device 11 with reference to FIGS. 24 and 25. FIGS. 24 and 25 illustrate flowcharts representing the operation of the content reproduction device.

As the reproduction of the linked content is initiated by the user operation, the operation shown in the flowchart of FIG. 24 begins. When it is instructed that the linked content should be reproduced, the VSI client 50 of the content reproduction device 11 acquires the VSI information from the specified URL (S201). Then, the VSI client 50 analyzes the VSI information acquired by the same client 50 (S202).

In step S203, the VSI client 50 identifies the scenario media type based on the VSI information. As described above, the VSI information includes the media type of the scenario in question. We assume here that the scenario media type is one of five types, i.e., application (App), still image (Still), slideshow (Slide), moving image (Video) and broadcast (Broadcast).

When it is determined in step S203 that the scenario media type is application, the process proceeds to step S204. In step S204, the VSI client 50 executes the target application. The scenario type is defined to be a termination scenario when the scenario media type is application. Therefore, when the execution of the application ends, the reproduction of the linked content ends.

When it is determined in step S203 that the scenario media type is still image, the process proceeds to step S205. In step S205, the VSI client 50 displays the still image of the target scenario.

When it is determined in step S203 that the scenario media type is slideshow, the process proceeds to step S206. In step S206, the VSI client 50 activates the display of the target scenario slideshow.

When it is determined in step S203 that the scenario media type is moving image, the process proceeds to step S207. In step S207, the VSI client 50 activates the streaming reproduction of the target scenario. At this time, the VSI client 50 initiates the streaming reproduction from the specified time position according to the circumstances.

When it is determined in step S203 that the scenario media type is broadcast, the process proceeds to step S208. In step S208, the display control section 53 controls the tuner 36 to select the channel appropriate to the URL given in the Location attribute of the entry element under the branch element. This allows for the video and audio signals for the channel selected by the tuner 36 to be fed to the selector 35. Further, the display control section 53 controls the selector 35 to switch the input of the selector 35 from the reproduction section 32 to the video decoder 38 or audio decoder 39. This allows for the image for the broadcast content of the specified channel to be displayed on the display section 40 and the sound thereof to be produced from the speaker 41.

It should be noted that a broadcast scenario is defined only as a branch scenario as described above. Further, when a branch occurs to a broadcast scenario, it is preferred to exit from the broadcast scenario in question, for example, by terminating the linked content after broadcast content of a specific channel is selected and displayed.

When the still image, slideshow and moving image begin to be reproduced respectively in steps S205, S206 and S207, the process proceeds to step S209. In step S209, the VSI client 50 determines whether or not the up, down, left or right key was operated by the user 300 using the operation section 34, input device or other device. When it is determined in step S209 that the up, down, left or right key was operated, the display control section 53 displays the cursor and moves the cursor position according to the key operation (S210). When the process in step S210 ends, the process returns to step S209 to perform the steps from this point onward.

On the other hand, if it is determined in step S209 that the up, down, left or right key was not operated, the process proceeds to step S211. In step S211, the VSI client 50 determines whether or not the Enter key was operated. When it is determined in step S211 that the Enter key was operated, it is determined whether or not the Enter key was operated within the target event (S212).

Any of the above-described time event, space event, time-space event, absolute time-of-day event and absolute time-of-day-time event corresponds to this target event. It should be noted that, in the case of an auto event, a scenario automatically branches to another scenario regardless of user operation.

If it is determined that the Enter key was not operated within the target event in step S212, the process returns to step S216 again. On the other hand, when it is determined that the Enter key was operated within the target event in step S212, the process proceeds to step S215 shown in FIG. 25.

If it is determined in step S211 that the Enter key was not operated, the VSI client 50 determines next whether or not the scenario has ended (S213). If it is determined in step S213 that the scenario has not ended, the process returns to step S209 to determine whether or not the up, down, left or right key was operated. That is, the process from step S209 to S213 are repeated until the Enter key is operated within the target event or until the reproduction of the scenario ends.

Then, when the VSI client 50 determines in step S213 that the reproduction of the scenario has ended, the process proceeds to step S214. In step S214, the VSI client 50 determines whether or not the scenario is a linked content end case. That is, linked content end case refers to a case in which the scenario being reproduced is a termination scenario.

When it is determined in step S214 that the scenario is a linked content end case, the reproduction of the linked content ends. On the other hand, if it is determined in step S214 that the scenario is not a linked content end case, the process proceeds to step S215 shown in FIG. 25.

In step S215, the VSI client 50 displays a bridge. Here, the VSI client 50 determines whether or not the scenario that has been reproduced up to this point is a loop scenario and whether or not the reproduction of the loop scenario has ended (S216). When it is determined in step S216 that the loop scenario has ended, the VSI client 50 specifies the VSI URL of the scenario to which to return and the resume position (the point in time of the move) (step S217). Then, the process proceeds to step S227.

On the other hand, if it is determined in step S216 that the loop scenario has not ended, the VSI client 50 determines next whether or not the bridge displayed in step S215 is an immediate bridge (S218). This determination process is performed based on the bridge element of the bridge displayed in step S215.

When it is determined in step S218 that the bridge displayed in step S215 is an immediate bridge, the process proceeds to step S225. On the other hand, if it is determined in step S218 that the bridge displayed in step S215 is not an immediate bridge, the VSI client 50 determines next whether or not the up or down key was operated by the user using the operation section 34 or input device (S219). Then, when it is determined in step S219 that the up or down key was operated, the display control section 53 moves the cursor according to the up or down key operation (S220). On the other hand, if it is determined in step S219 that the up or down key was not operated, the process proceeds to step S221. In step S221, the VSI client 50 determines whether the Enter key was operated.

If it is determined in step S221 that the Enter key was not operated, the process returns to step S219. On the other hand, when it is determined in step S221 that the Enter key was operated, the process returns to step S222. In step S222, the VSI client 50 determines whether or not the selected option is an option adapted to return to the original scenario.

When it is determined in step S222 that the selected option is an option adapted to return to the original scenario, the process returns to the operation in step S203 shown in FIG. 24. On the other hand, if it is determined in step S222 that the selected option is not an option adapted to return to the original scenario, the process proceeds to step S223. In step S223, the VSI client 50 determines whether or not the scenario to which to move is a loop scenario.

If it is determined in step S223 that the scenario to which to move is not a loop scenario, the VSI client 50 releases the VSI information (S224). On the other hand, when it is determined in step S223 that the scenario to which to move is a loop scenario, the VSI client 50 retains the VSI URL of the scenario currently being reproduced and the resume information (S225).

Then, the VSI client 50 specifies the VSI URL of the scenario to which to move and the streaming start position, verifies the token and sets the token in the VSI URL (S227). When step S227 ends, the process proceeds to step S201.

This completes the description of the reproduction of linked content.

The above reproduction of linked content makes it possible to display a moving image, still image, slideshow, application or broadcast content according to the media type of the scenario. Further, it is possible to move from a current scenario to another scenario if a time event, space event, time-space event, absolute time-of-day event or absolute time-of-day-time event occurs.

A description has been given above of the functionality of the content reproduction system 1 and the detailed specification of linked content. By using the content reproduction system 1 configured as described above, it is possible to provide a variety of linked content that is coordinated with broadcast content. This allows for new and unprecedented content to be provided. For this reason, a description will be given below of an example of linked content that can be provided using the content reproduction system 1.

For example, we imagine a scene in which the scenario S1, i.e., a main scenario of a virtual space for a tour in a studio, provided by a news program, is started and the user moves in the virtual space as illustrated in FIG. 26. If an absolute time-of-day event or absolute time-of-day-time event occurs when the user is at a specific location in the virtual space, the user is guided from that location into the theater. A broadcast scenario begins in the theater so that the user views the broadcast content.

As described above, it is possible to cause an event to occur at a specific date and time or switch to broadcast content when moving to other scenario by using an absolute time-of-day event or absolute time-of-day-time event, thus providing linked content offering a variety of scenarios.

It should be noted that although it has been described above that content data is one of moving image content, still image content, slideshow content, application content and broadcast content, the present technology is not limited thereto. Instead, content data may include, for example, audio content such as music, lecture, or radio program.

[Configuration Example of the Computer]

Incidentally, the above series of processes may be performed by hardware or software. If the series of processes are performed by software, the program making up the software is installed from a program recording media to a computer incorporated in dedicated hardware or a general-purpose personal computer capable of performing various functions when installed with various programs.

Figure 27:
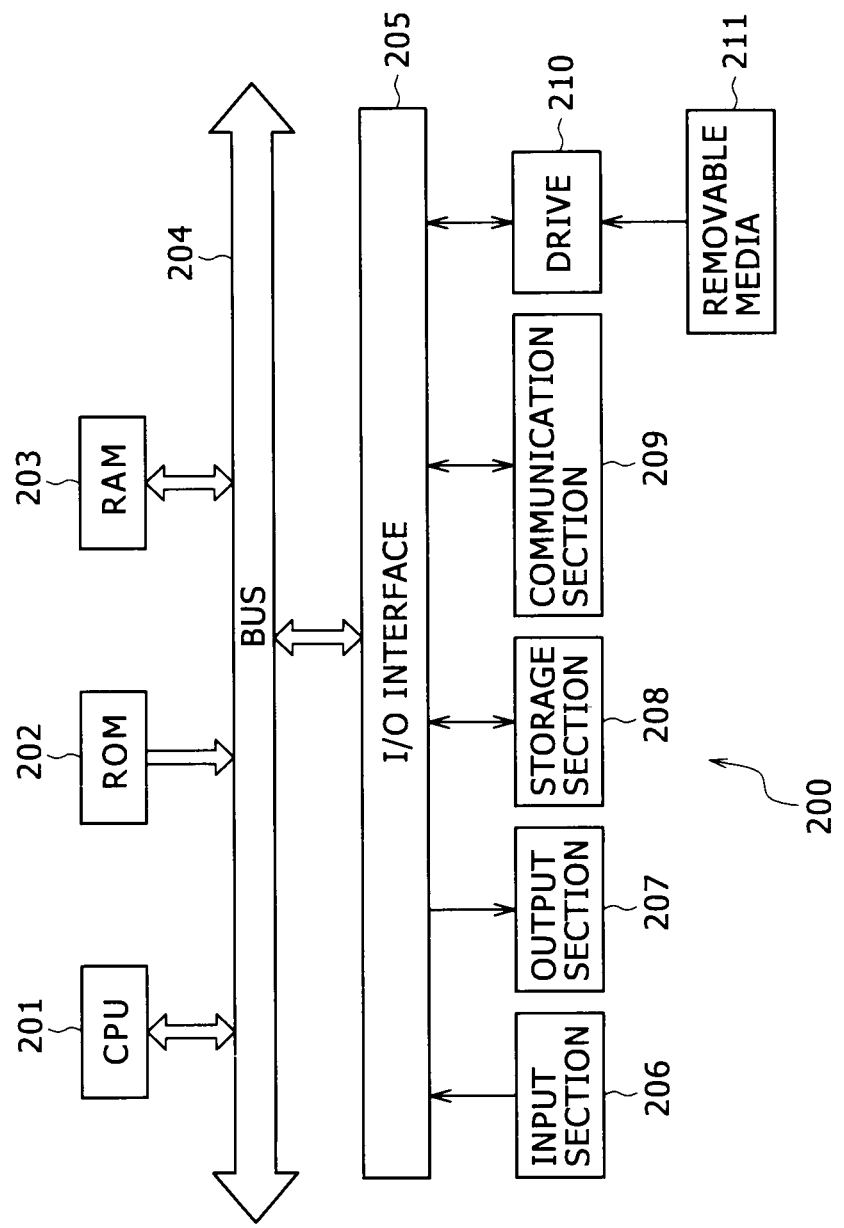
FIG. 27 is a diagram illustrating a configuration example of a computer.

FIG. 27 illustrates a configuration example of computer hardware adapted to perform the above series of processes using a program.

In a computer 200, a CPU (Central Processing Unit) 201, ROM (Read Only Memory) 202 and RAM (Random Access Memory) 203 are connected to each other via a bus 204.

An I/O interface 205 is also connected to the bus 204. An input section 206, output section 207, storage section 208, communication section 209 and drive 210 are connected to the I/O interface 205. The input section 206 includes, for example, a keyboard, mouse and microphone. The output section 207 includes, for example, a display and speaker. The storage section 208 includes, for example, a hard disk or non-volatile memory. The communication section 209 includes, for example, a network interface. The drive 210 drives a removable media such as magnetic disk, optical disk, magneto-optical disk, or semiconductor memory.

In the computer configured as described above, the CPU 201 loads the program from the storage section 208 into the RAM 203 for execution via the I/O interface 205 and bus 204, thus performing the above series of processes.

It should be noted that the program executed by the computer may perform the processes chronologically according to the sequence described in the present specification or perform the processes in parallel or when necessary as when invoked.

On the other hand, the program may be handled by a single computer or by a plurality of computers in a distributed manner. Further, the program may be transferred to a remote computer for execution.

It should be noted that the term "system" in the present specification refers to an apparatus as a whole made up of a plurality of devices.

Further, the embodiment of the present technology is not limited to that described above, but may be modified in various manners without departing from the scope of the present technology.

Still further, the present technology may be configured as described below.

[1]

An information processor including: a content acquisition section adapted to acquire linked content that includes a plurality of scenarios, each made up of content data and control information used to control the reproduction of the content data; a control information acquisition section adapted to acquire the control information; and a reproduction control section adapted to control the reproduction of the linked content by reproducing the content data according to the control information, in which the control information acquisition section acquires, as an event adapted to allow a move from the current scenario to another, the control information including an absolute time-of-day event that occurs at a specific date and time on the scenario time axis, and in which the reproduction control section allows a move from the current scenario to another if the absolute time-of-day event occurs.

[2]

The information processor of [1] in which the control information acquisition section acquires, as the event, the control information including the absolute time-of-day event that occurs only in a time event in a predetermined time frame delimited by start and end points on the scenario time axis, and in which the reproduction control section allows a move from the current scenario to another if the absolute time-of-day event occurs in the predetermined time frame.

[3]

The information processor of [1] or [2] further including: a reception section adapted to receive broadcast content that is broadcast via a broadcasting network; and a display control section adapted to switch content used to display another scenario, to which a move is made from the current scenario, from the linked content to the broadcast content if the absolute time-of-day event occurs.

[4]

The information processor of [3] in which the control information acquisition section acquires the control information including information used to identify the broadcast content, and in which the display control section displays the broadcast content received according to the control information.

[5]

The information processor of any of [1] to [4] in which the reproduction control section forcefully causes a move from the current scenario to another scenario that is reproduced at a specific date and time if the absolute time-of-day event occurs.

[6]

The information processor of any of [1] to [4] in which the reproduction control section causes a move from the current scenario to another scenario that is reproduced at a specific date and time if the absolute time-of-day event occurs and if so instructed by the user operation.

[7]

An information processing method including the steps of: an information processor acquiring linked content that includes a plurality of scenarios, each made up of content data and control information used to control the reproduction of the content data; the information processor acquiring the control information; the information processor controlling the reproduction of the linked content by reproducing the content data according to the control information; the information processor acquiring, as an event adapted to allow a move from the current scenario to another, the control information including an absolute time-of-day event that occurs at a specific date and time on the scenario time axis; and the information processor allowing a move from the current scenario to another if the absolute time-of-day event occurs.

[8]

A program for controlling an information processor, the program causing a computer of the information processor to perform the steps of: acquiring linked content that includes a plurality of scenarios, each made up of content data and control information used to control the reproduction of the content data; acquiring the control information; controlling the reproduction of the linked content by reproducing the content data according to the control information; acquiring, as an event adapted to allow a move from the current scenario to another, the control information including an absolute time-of-day event that occurs at a specific date and time on the scenario time axis; and allowing a move from the current scenario to another scenario if the absolute time-of-day event occurs.

What is claimed is:

1. An information processor comprising:
a content acquisition section adapted to acquire linked content that includes a plurality of scenarios, each of the plurality of scenarios being made up of content data and control information used to control the reproduction of the content data;
a control information acquisition section adapted to acquire the control information associated with one of the plurality of scenarios, the control information identifying another one of the plurality of scenarios to which the one of the plurality of scenarios is linked; and
a reproduction control section adapted to control the reproduction of the linked content by reproducing the content data associated with the one of the plurality of scenarios according to the control information associated with the one of the plurality of scenarios, wherein
the control information acquisition section acquires, as an event adapted to allow a move from the one of the plurality of scenarios to the other one of the plurality of scenarios, the control information including an absolute time-of-day event that occurs at a specific date and time on scenario time axis, and
the reproduction control section allows a move from the one of the plurality of scenarios to the other one of the plurality of scenarios when the absolute time-of-day event occurs.

2. The information processor of claim 1, wherein the circuitry is configured to
acquire, as the event, the control information including a predetermined time frame of the absolute-time-of-day event delimited by start and end points on the scenario time axis, and
allow the move from the one of the plurality of scenarios to the other one of the plurality of scenarios when the absolute time-of-day event occurs in the predetermined time frame.

3. The information processor of claim 2, wherein the circuitry is further configured to
receive television broadcast content that is broadcast via a broadcasting network; and
switch content used to display the other of the plurality of scenarios, to which the move is made from the one of the plurality of scenarios, from the linked content to the television broadcast content when the absolute time-of-day event occurs.

4. The information processor of claim 3, wherein the circuitry is configured to
acquire the control information, associated with the television broadcast content, including information used to identify the television broadcast content, and
display the television broadcast content received according to the control information associated with the television broadcast content.

5. The information processor of claim 2, wherein the circuitry is configured to forcefully cause the move from the one of the plurality of scenarios to the other one of the plurality of scenarios when the absolute time-of-day event occurs.

6. The information processor of claim 2, wherein the circuitry is configured to cause the move from the one of the plurality of scenarios to the other one of the plurality of scenarios when the absolute time-of-day event occurs and when so instructed by a user operation.

7. A method of an information processor for reproducing linked content, the method comprising:
acquiring linked content that includes a plurality of scenarios, each of the plurality of scenarios being made up of content data and control information used to control the reproduction of the content data;
acquiring the control information associated with one of the plurality of scenarios, the control information identifying another one of the plurality of scenarios to which the one of the plurality of scenarios is linked;
controlling, by the information processor, the reproduction of the linked content by reproducing the content data associated with the one of the plurality of scenarios according to the control information associated with the one of the plurality of scenarios;
acquiring, as an event adapted to allow a move from the one of the plurality of scenarios to the other one of the plurality of scenarios, the control information including an absolute time-of-day event that occurs at a specific date and time on a scenario time axis; and
allowing, by the information processor, a move from the one of the plurality of scenarios to the other one of the plurality of scenarios when the absolute time-of-day event occurs.

8. A non-transitory computer-readable storage medium storing a program for controlling an information processor, the program causing a computer of the information processor to perform the method according to claim 7.

9. An information processor comprising:
circuitry configured to
acquire linked content that includes a plurality of scenarios, each of the plurality of scenarios being made up of content data and control information used to control the reproduction of the content data,
acquire the control information associated with one of the plurality of scenarios, the control information identifying another one of the plurality of scenarios to which the one of the plurality of scenarios is linked,
control the reproduction of the linked content by reproducing the content data associated with the one of the plurality of scenarios according to the control information associated with the one of the plurality of scenarios,
acquire, as an event adapted to allow a move from the one of the plurality of scenarios to the other one of the plurality of scenarios, the control information including an absolute time-of-day event that occurs at a specific date and time on a scenario time axis, and
allow a move from the one of the plurality of scenarios to the other one of the plurality of scenarios when the absolute time-of-day event occurs.

10. The information processor of claim 9, wherein the circuitry is configured to
determine a current time-of-day when the content data associated with the one of the plurality of scenarios is being reproduced according to the control information, and
allow the move from the one of the plurality of scenarios to the other one of the plurality of scenarios when the absolute time-of-day event occurs based on the determined current time-of-day.

11. The information processor of claim 9, wherein the control information including the absolute time-of-day event includes start and end times of the absolute time-of-day event.

12. The information processor of claim 9, wherein the control information associated with the one of the plurality of scenarios includes, and defines, the absolute time-of-day event.

* * * * *